US012706647B2

(12) United States Patent
Bae et al.

(10) Patent No.: US 12,706,647 B2
(45) Date of Patent: Aug. 11, 2026

(54) METHOD FOR TRANSMITTING CHANNEL STATE INFORMATION REPORT, USER EQUIPMENT, PROCESSING DEVICE AND STORAGE MEDIUM, AND METHOD FOR RECEIVING CHANNEL STATE INFORMATION REPORT AND BASE STATION

(71) Applicant: LG Electronics Inc., Seoul (KR)

(72) Inventors: Duckhyun Bae, Seoul (KR); Suckchel Yang, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 329 days.

(21) Appl. No.: 18/558,316

(22) PCT Filed: May 10, 2022

(86) PCT No.: PCT/KR2022/006642

§ 371 (c)(1),
(2) Date: Oct. 31, 2023

(87) PCT Pub. No.: WO2022/240131

PCT Pub. Date: Nov. 17, 2022

(65) Prior Publication Data

US 2025/0088242 A1 Mar. 13, 2025

(30) Foreign Application Priority Data

May 10, 2021 (KR) ........................ 10-2021-0060320
May 11, 2021 (KR) ........................ 10-2021-0060954
Aug. 6, 2021 (KR) ........................ 10-2021-0104059

(51) Int. Cl.
*H04B 7/06* (2006.01)
*H04W 24/10* (2009.01)

(52) U.S. Cl.
CPC .......... *H04B 7/0626* (2013.01); *H04W 24/10* (2013.01)

(58) Field of Classification Search
CPC ....... H04B 7/0626; H04B 7/06; H04W 24/10; H04W 72/20–23; H04L 1/0026;
(Continued)

(56) References Cited

U.S. PATENT DOCUMENTS

2021/0391909 A1* 12/2021 Lee ........................ H04B 7/063

FOREIGN PATENT DOCUMENTS

WO 2018/231812 A1 12/2018

OTHER PUBLICATIONS

European Search Report in European Appln. No. 22807779.8, mailed on Apr. 11, 2025, 9 pages.

* cited by examiner

*Primary Examiner* — Eric Myers
(74) *Attorney, Agent, or Firm* — Fish & Richardson P.C.

(57) ABSTRACT

UE: receives radio resource control configuration associated with a CSI report; receives trigger information for triggering a report of a set of CSI values configured by means of the radio resource control configuration; determines a measurement resource for the CSI report and an uplink resource for the CSI report, on the basis of the radio resource configuration and trigger information; and performs a partial CSI report in which only a part of the set of CSI values is calculated and the calculated CSI value is transmitted in the uplink resource, on the basis of which the time differential between the measurement resource and the uplink resource satisfies a predetermined condition.

11 Claims, 8 Drawing Sheets

(58) Field of Classification Search
CPC ... H04L 1/0029; H04L 5/0057; H04L 1/0027; H04L 5/0094; Y02D 30/70
See application file for complete search history.

(a) Example of PDSCH time domain resource allocation (b) Example of PUSCH time domain resource allocation

METHOD FOR TRANSMITTING CHANNEL STATE INFORMATION REPORT, USER EQUIPMENT, PROCESSING DEVICE AND STORAGE MEDIUM, AND METHOD FOR RECEIVING CHANNEL STATE INFORMATION REPORT AND BASE STATION

CROSS-REFERENCE TO RELATED APPLICATIONS

This application is a National Stage application under 35 U.S.C. § 371 of International Application No. PCT/KR2022/006642, filed on May 10, 2022, which claims the benefit of Korean Application Nos. 10-2021-0104059, filed on Aug. 6, 2021, 10-2021-0060954, filed on May 11, 2021, and 10-2021-0060320, filed on May 10, 2021. The disclosures of the prior applications are incorporated by reference in their entirety.

TECHNICAL FIELD

The present disclosure relates to a wireless communication system.

BACKGROUND

A variety of technologies, such as machine-to-machine (M2M) communication, machine type communication (MTC), and a variety of devices demanding high data throughput, such as smartphones and tablet personal computers (PCs), have emerged and spread. Accordingly, the volume of data throughput demanded to be processed in a cellular network has rapidly increased. In order to satisfy such rapidly increasing data throughput, carrier aggregation technology or cognitive radio technology for efficiently employing more frequency bands and multiple input multiple output (MIMO) technology or multi-base station (BS) cooperation technology for raising data capacity transmitted on limited frequency resources have been developed.

As more and more communication devices have required greater communication capacity, there has been a need for enhanced mobile broadband (eMBB) communication relative to legacy radio access technology (RAT). In addition, massive machine type communication (mMTC) for providing various services at anytime and anywhere by connecting a plurality of devices and objects to each other is one main issue to be considered in next-generation communication.

Communication system design considering services/user equipment (UEs) sensitive to reliability and latency is also under discussion. The introduction of next-generation RAT is being discussed in consideration of eMBB communication, mMTC, ultra-reliable and low-latency communication (URLLC), and the like.

SUMMARY

As new radio communication technology has been introduced, the number of UEs to which a BS should provide services in a prescribed resource region is increasing and the volume of data and control information that the BS transmits/receives to/from the UEs to which the BS provides services is also increasing. Since the amount of resources available to the BS for communication with the UE(s) is limited, a new method for the BS to efficiently receive/transmit uplink/downlink data and/or uplink/downlink control information from/to the UE(s) using the limited radio resources is needed. In other words, due to increase in the density of nodes and/or the density of UEs, a method for efficiently using high-density nodes or high-density UEs for communication is needed.

A method to efficiently support various services with different requirements in a wireless communication system is also needed.

Overcoming delay or latency is an important challenge to applications, performance of which is sensitive to delay/latency.

To support new services (e.g., URLLC), there is a need for a method of providing channel state information to a BS more quickly and with higher reliability.

The objects to be achieved with the present disclosure are not limited to what has been particularly described hereinabove and other objects not described herein will be more clearly understood by persons skilled in the art from the following detailed description.

In an aspect of the present disclosure, there is provided a method of transmitting a channel state information (CSI) report by a user equipment (UE) in a wireless communication system. The method may include: receiving a radio resource control configuration related to CSI reporting; receiving trigger information that triggers reporting of a set of CSI values configured by the radio resource control configuration; determining a measurement resource for the CSI report and an uplink resource for the CSI report based on the radio resource configuration and the trigger information; and based on that a time difference between the measurement resource and the uplink resource satisfies a predetermined condition, performing partial CSI reporting in which only part of the set of CSI values is calculated and the calculated CSI values are transmitted on the uplink resource.

In another aspect of the present disclosure, there is provided a UE configured to transmit a CSI report in a wireless communication system. The UE may include: at least one transceiver; at least one processor, and at least one computer memory operably connected to the at least one processor and configured to store instructions that, when executed, cause the at least one processor to perform operations. The operations may include: receiving a radio resource control configuration related to CSI reporting; receiving trigger information that triggers reporting of a set of CSI values configured by the radio resource control configuration; determining a measurement resource for the CSI report and an uplink resource for the CSI report based on the radio resource configuration and the trigger information; and based on that a time difference between the measurement resource and the uplink resource satisfies a predetermined condition, performing partial CSI reporting in which only part of the set of CSI values is calculated and the calculated CSI values are transmitted on the uplink resource.

In another aspect of the present disclosure, there is provided a processing device in a wireless communication system. The processing device may include: at least one processor; and at least one computer memory operably connected to the at least one processor and configured to store instructions that, when executed, cause the at least one processor to perform operations. The operations may include: receiving a radio resource control configuration related to CSI reporting; receiving trigger information that triggers reporting of a set of CSI values configured by the radio resource control configuration; determining a measurement resource for a CSI report and an uplink resource for the CSI report based on the radio resource configuration and the trigger information; and based on that a time difference between the measurement resource and the uplink resource satisfies a predetermined condition, performing partial CSI reporting in which only part of the set of CSI values is calculated and the calculated CSI values are transmitted on the uplink resource.

In another aspect of the present disclosure, there is provided a computer-readable storage medium. The storage medium may be configured to store at least one program code including instructions that, when executed, cause at least one processor to perform operations. The operations may include: receiving a radio resource control configuration related to CSI reporting; receiving trigger information that triggers reporting of a set of CSI values configured by the radio resource control configuration; determining a measurement resource for a CSI report and an uplink resource for the CSI report based on the radio resource configuration and the trigger information; and based on that a time difference between the measurement resource and the uplink resource satisfies a predetermined condition, performing partial CSI reporting in which only part of the set of CSI values is calculated and the calculated CSI values are transmitted on the uplink resource.

In another aspect of the present disclosure, there is provided a computer program stored in a computer-readable storage medium. The computer program may include at least one program code including instructions that, when executed, cause at least one processor to perform operations. The operations may include: receiving a radio resource control configuration related to CSI reporting; receiving trigger information that triggers reporting of a set of CSI values configured by the radio resource control configuration; determining a measurement resource for a CSI report and an uplink resource for the CSI report based on the radio resource configuration and the trigger information; and based on that a time difference between the measurement resource and the uplink resource satisfies a predetermined condition, performing partial CSI reporting in which only part of the set of CSI values is calculated and the calculated CSI values are transmitted on the uplink resource.

In another aspect of the present disclosure, there is provided a method of receiving a CSI report by a base station (BS) in a wireless communication system. The method may include: transmitting a radio resource control configuration related to CSI reporting to a UE; transmitting, to the UE, trigger information that triggers reporting of a set of CSI values configured by the radio resource control configuration; receiving the trigger information that triggers reporting of the set of CSI values configured by the radio resource control configuration; determining a measurement resource for the CSI report and an uplink resource for the CSI report based on the radio resource configuration and the trigger information; and based on that a time difference between the measurement resource and the uplink resource satisfies a predetermined condition, receiving partial CSI reporting in which only part of the set of CSI values is received on the uplink resource.

In a further aspect of the present disclosure, there is provided a BS configured to receive a CSI report in a wireless communication system. The BS may include: at least one transceiver; at least one processor; and at least one computer memory operably connected to the at least one processor and configured to store instructions that, when executed, cause the at least one processor to perform operations. The operations may include: transmitting a radio resource control configuration related to CSI reporting to a UE; transmitting, to the UE, trigger information that triggers reporting of a set of CSI values configured by the radio resource control configuration, receiving the trigger information that triggers reporting of the set of CSI values configured by the radio resource control configuration; determining a measurement resource for the CSI report and an uplink resource for the CSI report based on the radio resource configuration and the trigger information; and based on that a time difference between the measurement resource and the uplink resource satisfies a predetermined condition, receiving partial CSI reporting in which only part of the set of CSI values is received on the uplink resource.

In each aspect of the present disclosure, the predetermined condition may include that the time difference is smaller than a CSI computation time T1 predefined based on full CSI reporting in which the entirety of the configured set of CSI values is calculated and greater than a time T2 based on an end of the measurement resource for the partial CSI reporting.

In each aspect of the present disclosure, the operations may include, based on that the time difference is greater than T2, performing or receiving the full CSI reporting in which the entirety of the set of CSI values is calculated and the calculated set of CSI values is transmitted on the uplink resource.

In each aspect of the present disclosure, the measurement resource may not be later than the uplink resource.

In each aspect of the present disclosure, the radio resource control configuration may include a CSI configuration for the partial CSI reporting.

In each aspect of the present disclosure, regarding the operations, performing the partial CSI reporting may include transmitting or receiving additional information about the partial CSI reporting on the uplink resource.

The foregoing solutions are merely a part of the examples of the present disclosure and various examples into which the technical features of the present disclosure are incorporated may be derived and understood by persons skilled in the art from the following detailed description.

According to some implementations of the present disclosure, a wireless communication signal may be efficiently transmitted/received. Accordingly, the total throughput of a wireless communication system may be raised.

According to some implementations of the present disclosure, various services with different requirements may be efficiently supported in a wireless communication system.

According to some implementations of the present disclosure, delay/latency generated during radio communication between communication devices may be reduced.

According to some implementations of the present disclosure, a channel state information (CSI) processing time may be reduced.

According to some implementations of the present disclosure, CSI may be provided to a base station (BS) more quickly and with higher reliability.

According to some implementations of the present disclosure, a user equipment (UE) may use less information for CSI reporting, and thus, the BS may achieve the same level of reliability using fewer radio resources, which may assist in conserving overall uplink system resources.

The effects according to the present disclosure are not limited to what has been particularly described hereinabove and other effects not described herein will be more clearly understood by persons skilled in the art related to the present disclosure from the following detailed description.

BRIEF DESCRIPTION OF THE DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Figure 1:
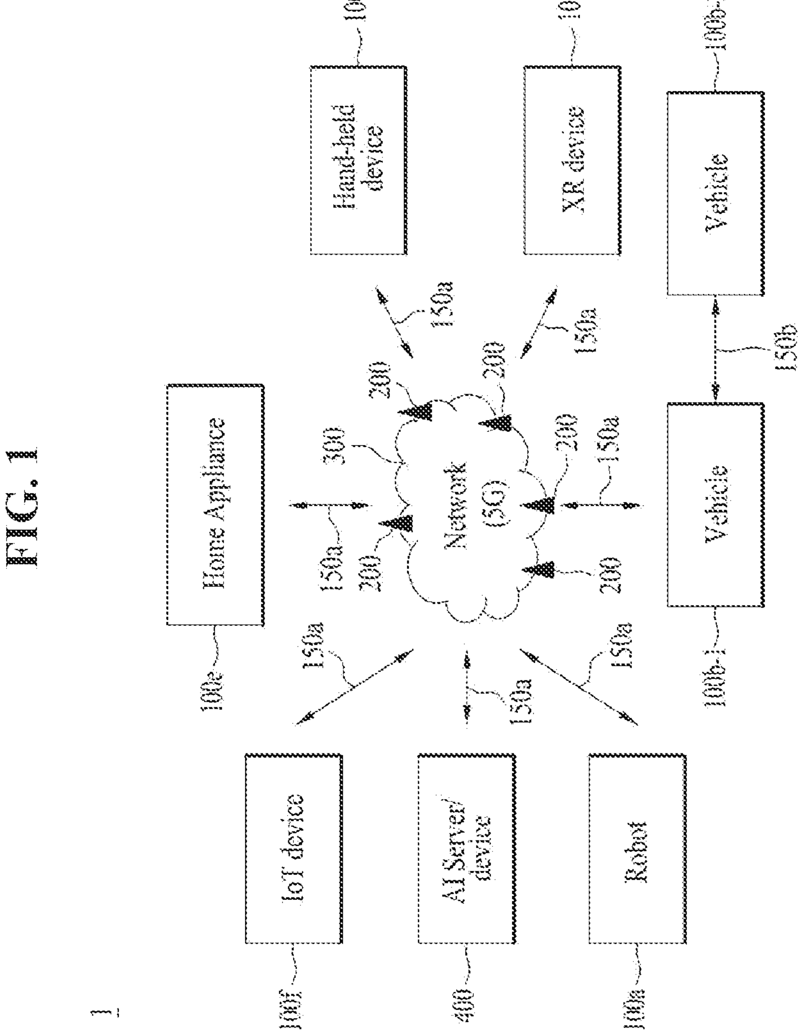
FIG. 1 illustrates an example of a communication system 1 to which implementations of the present disclosure are applied.

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts OFDMA on downlink (DL) and adopts SC-FDMA on uplink (UL). LTE-advanced (LTE-A) is an evolved version of 3GPP LTE.

For convenience of description, description will be given under the assumption that the present disclosure is applied to LTE and/or new RAT (NR). However, the technical features of the present disclosure are not limited thereto. For example, although the following detailed description is given based on mobile communication systems corresponding to 3GPP LTE/NR systems, the mobile communication systems are applicable to other arbitrary mobile communication systems except for matters that are specific to the 3GPP LTE/NR system.

For terms and techniques that are not described in detail among terms and techniques used in the present disclosure, reference may be made to 3GPP based standard specifications, for example, 3GPP TS 36.211, 3GPP TS 36.212, 3GPP TS 36.213, 3GPP TS 36.321, 3GPP TS 36.300, 3GPP TS 36.331, 3GPP TS 37.213, 3GPP TS 38.211, 3GPP TS 38.212, 3GPP TS 38.213, 3GPP TS 38.214, 3GPP TS 38.300, 3GPP TS 38.331, etc.

In examples of the present disclosure described later, if a device "assumes" something, this may mean that a channel transmission entity transmits a channel in compliance with the corresponding "assumption". This also may mean that a channel reception entity receives or decodes the channel in the form of conforming to the "assumption" on the premise that the channel has been transmitted in compliance with the "assumption".

In the present disclosure, a user equipment (UE) may be fixed or mobile. Each of various devices that transmit and/or receive user data and/or control information by communicating with a base station (BS) may be the UE. The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE by communication with the UE. Various types of BSs may be used as nodes regardless of the names thereof. For example, a BS, NB, eNB, pico-cell eNB (PeNB), home eNB (HeNB), relay, repeater, etc. may be a node. Furthermore, a node may not be a BS. For example, a radio remote head (RRH) or a radio remote unit (RRU) may be a node. Generally, the RRH and RRU have power levels lower than that of the BS. Since the RRH or RRU (hereinafter, RRH/RRU) is connected to the BS through a dedicated line such as an optical cable in general, cooperative communication according to the RRH/RRU and the BS may be smoothly performed relative to cooperative communication according to BSs connected through a wireless link. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE. In 3GPP-based communication systems, the UE may measure a DL channel state from a specific node using cell-specific reference signal(s) (CRS(s)) transmitted on a CRS resource and/or channel state information reference signal(s) (CSI-RS(s)) transmitted on a CSI-RS resource, allocated to the specific node by antenna port(s) of the specific node.

A 3GPP-based communication system uses the concept of a cell in order to manage radio resources, and a cell related with the radio resources is distinguished from a cell of a geographic area.

The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signal from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times.

In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources. If carrier aggregation is supported, linkage between a carrier frequency of the DL resources (or DL CC) and a carrier frequency of the UL resources (or UL CC) may be indicated by system information. For example, the combination of the DL resources and the UL resources may be indicated by system information block type 2 (SIB2) linkage. In this case, the carrier frequency may be equal to or different from a center frequency of each cell or CC. When carrier aggregation (CA) is configured, the UE has only one radio resource control (RRC) connection with a network. During RRC connection establishment/re-establishment/handover, one serving cell provides non-access stratum (NAS) mobility information. During RRC connection re-establishment/handover, one serving cell provides security input. This cell is referred to as a primary cell (Pcell). The Pcell refers to a cell operating on a primary frequency on which the UE performs an initial connection establishment procedure or initiates a connection re-establishment procedure. According to UE capability, secondary cells (Scells) may be configured to form a set of serving cells together with the Pcell. The Scell may be configured after completion of RRC connection establishment and used to provide additional radio resources in addition to resources of a specific cell (SpCell). A carrier corresponding to the Pcell on DL is referred to as a downlink primary CC (DL PCC), and a carrier corresponding to the Pcell on UL is referred to as an uplink primary CC (UL PCC). A carrier corresponding to the Scell on DL is referred to as a downlink secondary CC (DL SCC), and a carrier corresponding to the Scell on UL is referred to as an uplink secondary CC (UL SCC).

In a dual connectivity (DC) operation, the term special cell (SpCell) refers to a Pcell of a master cell group (MCG) or a primary secondary cell (PSCell) of a secondary cell group (SCG). The SpCell supports PUCCH transmission and contention-based random access and is always activated. The MCG is a group of service cells associated with a master node (e.g., BS) and includes the SpCell (Pcell) and optionally one or more Scells. For a UE configured with DC, the SCG is a subset of serving cells associated with a secondary node and includes the PSCell and 0 or more Scells. The PSCell is a primary Scell of the SCG. For a UE in RRC_CONNECTED state, that is not configured with CA or DC, only one serving cell including only the Pcell is present. For a UE in RRC_CONNECTED state, that is configured with CA or DC, the term serving cells refers to a set of cells including SpCell(s) and all Scell(s). In DC, two medium access control (MAC) entities, i.e., one MAC entity for the MCG and one MAC entity for the SCG, are configured for the UE.

For a UE that is configured with CA and is not configured with DC, a Pcell PUCCH group (also called a primary PUCCH group) including the Pcell and 0 or more Scells and an Scell PUCCH group (also called a secondary PUCCH group) including only Scell(s) may be configured. For the Scell, an Scell on which a PUCCH associated with the corresponding cell is transmitted (hereinafter, a PUCCH cell) may be configured. An Scell for which a PUCCH Scell is indicated belongs to the Scell PUCCH group (i.e., the secondary PUCCH group) and PUCCH transmission of related uplink control information (UCI) is performed on the PUCCH Scell. If a PUCCH Scell is not indicated for an Scell or a cell which is indicated for PUCCH transmission for the Scell is a Pcell, the Scell belongs to the Pcell PUCCH group (i.e., the primary PUCCH group) and PUCCH transmission of related UCI is performed on the Pcell. Hereinbelow, if the UE is configured with the SCG and some implementations of the present disclosure related to a PUCCH are applied to the SCG, the primary cell may refer to the PSCell of the SCG. If the UE is configured with the PUCCH Scell and some implementations of the present disclosure related to the PUCCH are applied to the secondary PUCCH group, the primary cell may refer to the PUCCH Scell of the secondary PUCCH group.

In a wireless communication system, the UE receives information on DL from the BS and the UE transmits information on UL to the BS. The information that the BS and UE transmit and/or receive includes data and a variety of control information and there are various physical channels according to types/usage of the information that the UE and the BS transmit and/or receive.

The 3GPP-based communication standards define DL physical channels corresponding to resource elements carrying information originating from a higher layer and DL physical signals corresponding to resource elements which are used by the physical layer but do not carry the information originating from the higher layer. For example, a physical downlink shared channel (PDSCH), a physical broadcast channel (PBCH), a physical multicast channel (PMCH), a physical control format indicator channel (PCFICH), a physical downlink control channel (PDCCH), etc. are defined as the DL physical channels, and a reference signal (RS) and a synchronization signal (SS) are defined as the DL physical signals. The RS, which is also referred to as a pilot, represents a signal with a predefined special waveform known to both the BS and the UE. For example, a demodulation reference signal (DMRS), a channel state information RS (CSI-RS), etc. are defined as DL RSs. The 3GPP-based communication standards define UL physical channels corresponding to resource elements carrying information originating from the higher layer and UL physical signals corresponding to resource elements which are used by the physical layer but do not carry the information originating from the higher layer. For example, a physical uplink shared channel (PUSCH), a physical uplink control channel (PUCCH), and a physical random access channel (PRACH) are defined as the UL physical channels, and a DMRS for a UL control/data signal, a sounding reference signal (SRS) used for UL channel measurement, etc. are defined.

In the present disclosure, a PDCCH refers to a set of time-frequency resources (e.g., resource elements (REs)) carrying downlink control information (DCI), and a PDSCH refers to a set of time-frequency resources carrying DL data. A PUCCH, a PUSCH, and a PRACH refer to a set of time-frequency resources carrying UCI, a set of time-frequency resources carrying UL data, and a set of time-frequency resources carrying random access signals, respectively. In the following description, "the UE transmits/receives a PUCCH/PUSCH/PRACH" is used as the same meaning that the UE transmits/receives the UCI/UL data/random access signals on or through the PUCCH/PUSCH/PRACH, respectively. In addition, "the BS transmits/receives a PBCH/PDCCH/PDSCH" is used as the same meaning that the BS transmits the broadcast information/DCI/DL data on or through a PBCH/PDCCH/PDSCH, respectively.

In the present disclosure, a radio resource (e.g., a time-frequency resource) scheduled or configured to the UE by the BS for transmission or reception of the PUCCH/PUSCH/PDSCH may be referred to as a PUCCH/PUSCH/PDSCH resource.

Since a communication device receives a synchronization signal block (SSB), DMRS, CSI-RS, PBCH, PDCCH, PDSCH, PUSCH, and/or PUCCH in the form of radio signals on a cell, the communication device may not select and receive radio signals including only a specific physical channel or a specific physical signal through a radio frequency (RF) receiver, or may not select and receive radio signals without a specific physical channel or a specific physical signal through the RF receiver. In actual operations, the communication device receives radio signals on the cell via the RF receiver, converts the radio signals, which are RF band signals, into baseband signals, and then decodes physical signals and/or physical channels in the baseband signals using one or more processors. Thus, in some implementations of the present disclosure, reception of physical signals and/or physical channels may mean that a communication device does not attempt to restore the physical signals and/or physical channels from radio signals, for example, does not attempt to decode the physical signals and/or physical channels, rather than that the communication device does not actually receive the radio signals including the corresponding physical signals and/or physical channels.

As more and more communication devices have required greater communication capacity, there has been a need for eMBB communication relative to legacy radio access technology (RAT). In addition, massive MTC for providing various services at anytime and anywhere by connecting a plurality of devices and objects to each other is one main issue to be considered in next-generation communication. Further, communication system design considering services/UEs sensitive to reliability and latency is also under discussion. The introduction of next-generation RAT is being discussed in consideration of eMBB communication, massive MTC, ultra-reliable and low-latency communication (URLLC), and the like. Currently, in 3GPP, a study on the next-generation mobile communication systems after EPC is being conducted. In the present disclosure, for convenience, the corresponding technology is referred to as a new RAT (NR) or fifth-generation (5G) RAT, and a system using NR or supporting NR is referred to as an NR system.

FIG. 1 illustrates an example of a communication system 1 to which implementations of the present disclosure are applied. Referring to FIG. 1, the communication system 1 applied to the present disclosure includes wireless devices. BSs, and a network. Here, the wireless devices represent devices performing communication using RAT (e.g., 5G NR or LTE (e.g., E-UTRA)) and may be referred to as communication/radio/5G devices. The wireless devices may include, without being limited to, a robot 100*a*, vehicles 100*b*-1 and 100*b*-2, an extended reality (XR) device 100*c*, a hand-held device 100*d*, a home appliance 100*e*, an Internet of Things (IoT) device 100*f*, and an artificial intelligence (AI) device/server 400. For example, the vehicles may include a vehicle having a wireless communication function, an autonomous driving vehicle, and a vehicle capable of performing vehicle-to-vehicle communication. Here, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may also be implemented as wireless devices and a specific wireless device may operate as a BS/network node with respect to another wireless device.

The wireless devices 100*a* to 100*f* may be connected to a network 300 via BSs 200. AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., vehicle-to-vehicle (V2V)/Vehicle-to-everything (V2X) communication) The IoT device (e.g., a sensor) may perform direct communication with other IoT devices (e.g., sensors) or other wireless devices 100*a* to 100*f*.

Wireless communication/connections 150*a* and 150*b* may be established between the wireless devices 100*a* to 100*f* and the BSs 200 and between the wireless devices 100*a* to 100*f*). Here, the wireless communication/connections such as UL/DL communication 150*a* and sidelink communication 150*b* (or, device-to-device (D2D) communication) may be established by various RATs (e.g., 5G NR). The wireless devices and the BSs/wireless devices may transmit/receive radio signals to/from each other through the wireless communication/connections 150*a* and 150*b*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 2:
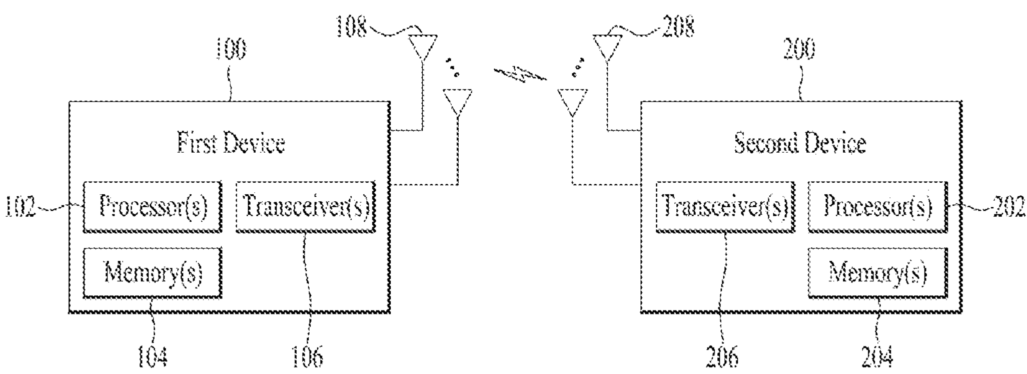
FIG. 2 is a block diagram illustrating examples of communication devices capable of performing a method according to the present disclosure.

FIG. 2 is a block diagram illustrating examples of communication devices capable of performing a method according to the present disclosure. Referring to FIG. 2, a first wireless device 100 and a second wireless device 200 may transmit and/or receive radio signals through a variety of RATs (e.g., LTE and NR). Here, {the first wireless device 100 and the second wireless device 200} may correspond to {the wireless device 100*x* and the BS 200} and/or {the wireless device 100*x* and the wireless device 100*x*} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the below-described/proposed functions, procedures, and/or methods. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may perform a part or all of processes controlled by the processor(s) 102 or store software code including instructions for performing the below-described/proposed procedures and/or methods. Here, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 is used interchangeably with radio frequency (RF) unit(s). In the present disclosure, the wireless device may represent the communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the below-described/proposed functions, procedures, and/or methods. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may perform a part or all of processes controlled by the processor(s) 202 or store software code including instructions for performing the below-described/proposed procedures and/or methods. Here, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 is used interchangeably with RF unit(s). In the present disclosure, the wireless device may represent the communication modem/circuit/chip.

The wireless communication technology implemented in the wireless devices 100 and 200 of the present disclosure may include narrowband Internet of things for low-power communication as well as LTE, NR, and 6G. For example, the NB-IoT technology may be an example of low-power wide-area network (LPWAN) technologies and implemented in standards such as LTE Cat NB1 and/or LTE Cat NB2. However, the NB-IoT technology is not limited to the above names. Additionally or alternatively, the wireless communication technology implemented in the wireless devices XXX and YYY of the present disclosure may perform communication based on the LTE-M technology. For example, the LTE-M technology may be an example of LPWAN technologies and called by various names including enhanced machine type communication (eMTC). For example, the LTE-M technology may be implemented in at least one of the following various standards: 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, etc., but the LTE-M technology is not limited to the above names. Additionally or alternatively, the wireless communication technology implemented in the wireless devices XXX and YYY of the present disclosure may include at least one of ZigBee, Bluetooth, and LPWAN in consideration of low-power communication, but the wireless communication technology is not limited to the above names. For example, the ZigBee technology may create a personal area network (PAN) related to small/low-power digital communication based on various standards such as IEEE 802.15.4 and so on, and the ZigBee technology may be called by various names.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as a physical (PHY) layer, medium access control (MAC) layer, a radio link control (RLC) layer, a packet data convergence protocol (PDCP) layer, radio resource control (RRC) layer, and a service data adaptation protocol (SDAP) layer). The one or more processors 102 and 202 may generate one or more protocol data units (PDUs) and/or one or more service data units (SDUs) according to the functions, procedures, proposals, and/or methods disclosed in the present disclosure. The one or more processors 102 and 202 may generate messages, control information, data, or information according to the functions, procedures, proposals, and/or methods disclosed in the present disclosure. The one or more processors 102 and 202 may generate signals (e.g., baseband signals) including PDUs, SDUs, messages, control information, data, or information according to the functions, procedures, proposals, and/or methods disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the functions, procedures, proposals, and/or methods disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The functions, procedures, proposals, and/or methods disclosed in the present disclosure may be implemented using firmware or software, and the firmware or software may be configured to include the modules, procedures, or functions. Firmware or software configured to perform the functions, procedures, proposals, and/or methods disclosed in the present disclosure may be included in the one or more processors 102 and 202 or stored in the one or more memories 104 and 204 so as to be driven by the one or more processors 102 and 202. The functions, procedures, proposals, and/or methods disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, commands, and/or instructions. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of the present disclosure, to one or more other devices. The one or more transceivers 106 and 206 may receive user data, control information, and/or radio signals/channels, mentioned in the functions, procedures, proposals, methods, and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208. The one or more transceivers 106 and 206 may be configured to transmit and receive user data, control information, and/or radio signals/channels, mentioned in the functions, procedures, proposals, methods, and/or operational flowcharts disclosed in the present disclosure, through the one or more antennas 108 and 208. In the present disclosure, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 3:
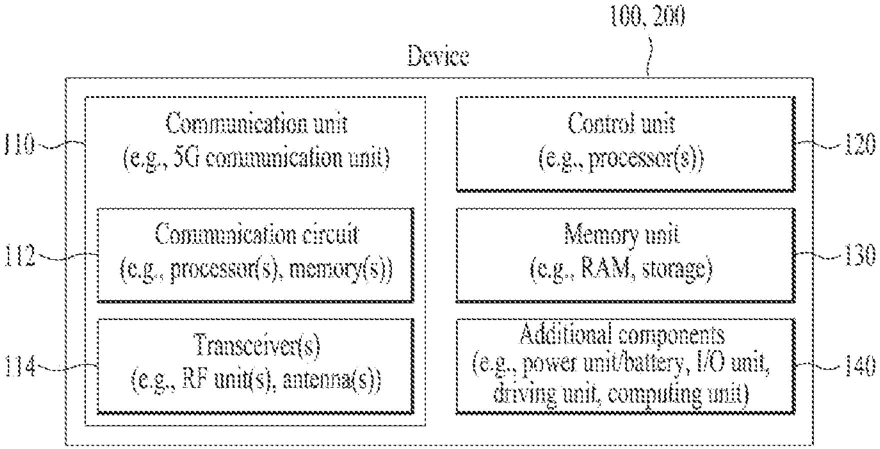
FIG. 3 illustrates another example of a wireless device capable of performing implementation(s) of the present disclosure.

FIG. 3 illustrates another example of a wireless device capable of performing implementation(s) of the present disclosure. Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 2. For example, the transceiver(s) 114 may include the one or more transceivers 106 and 206 and/or the one or more antennas 108 and 208 of FIG. 2. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast UE, a hologram device, a public safety device, an MTC device, a medicine device, a fintech device (or a finance device), a security device, a climate/environment device, the AI server/device (400 of FIG. 1), the BS (200 of FIG. 1), a network node, etc. The wireless device may be used in a mobile or fixed place according to a use-case/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read-only memory (ROM)), a flash memory, a transitory memory, a non-transitory memory, and/or a combination thereof.

In the present disclosure, the at least one memory (e.g., 104 or 204) may store instructions or programs, and the instructions or programs may cause, when executed, at least one processor operably connected to the at least one memory to perform operations according to some embodiments or implementations of the present disclosure.

In the present disclosure, a computer readable (non-transitory) storage medium may store at least one instruction or program, and the at least one instruction or program may cause, when executed by at least one processor, the at least one processor to perform operations according to some embodiments or implementations of the present disclosure.

In the present disclosure, a processing device or apparatus may include at least one processor, and at least one computer memory operably connected to the at least one processor. The at least one computer memory may store instructions or programs, and the instructions or programs may cause, when executed, the at least one processor operably connected to the at least one memory to perform operations according to some embodiments or implementations of the present disclosure.

In the present disclosure, a computer program may include program code stored on at least one computer-readable (non-transitory) storage medium and, when executed, configured to perform operations according to some implementations of the present disclosure or cause at least one processor to perform the operations according to some implementations of the present disclosure. The computer program may be provided in the form of a computer program product. The computer program product may include at least one computer-readable (non-transitory) storage medium.

A communication device of the present disclosure includes at least one processor; and at least one computer memory operably connected to the at least one processor and configured to store instructions for causing, when executed, the at least one processor to perform operations according to example(s) of the present disclosure described later.

Figure 4:
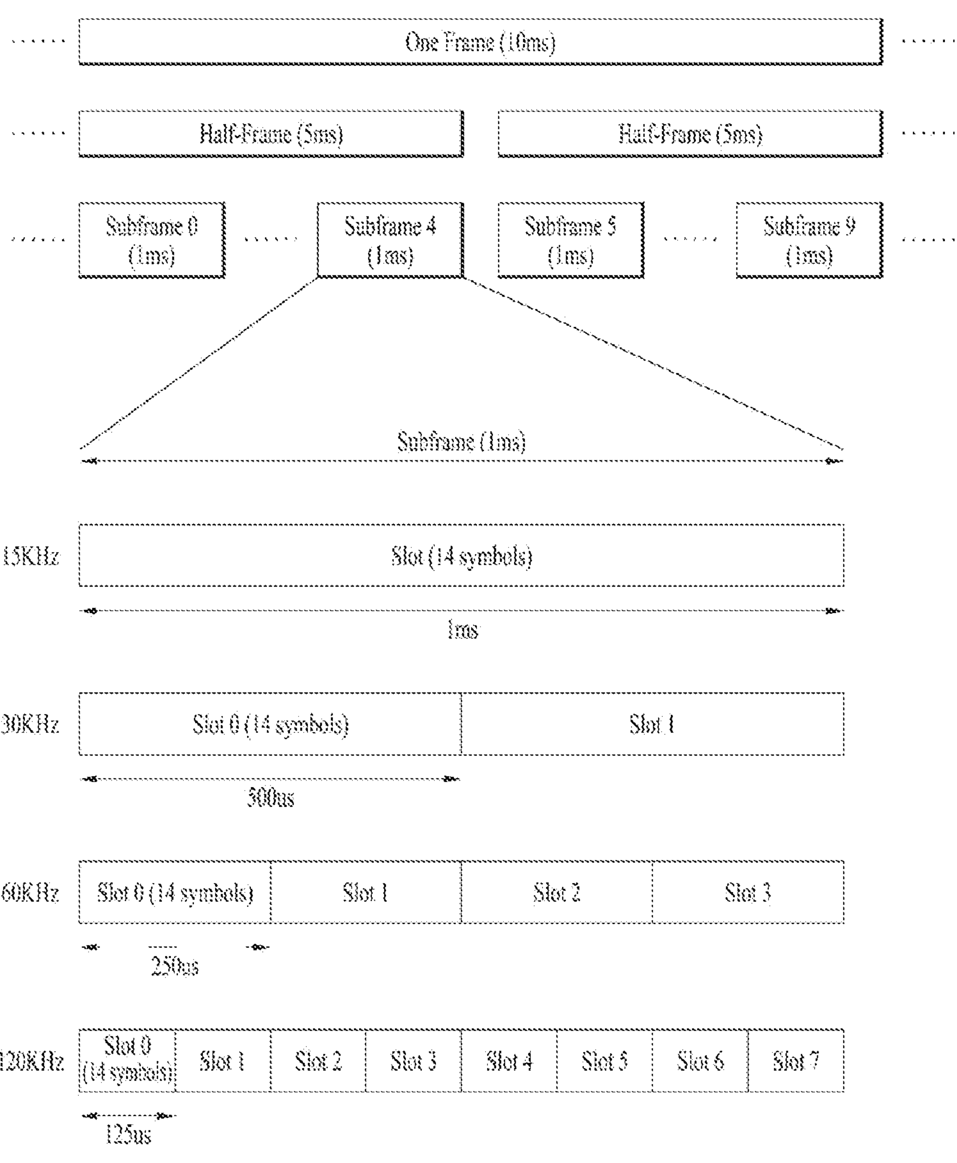
FIG. 4 illustrates an example of a frame structure used in a 3rd generation partnership project (3GPP)-based wireless communication system.

FIG. 4 illustrates an example of a frame structure used in a 3GPP-based wireless communication system.

The frame structure of FIG. 4 is purely exemplary and the number of subframes, the number of slots, and the number of symbols, in a frame, may be variously changed. In an NR system, different OFDM numerologies (e.g., subcarrier spacings (SCSs)) may be configured for multiple cells which are aggregated for one UE. Accordingly, the (absolute time) duration of a time resource including the same number of symbols (e.g., a subframe, a slot, or a transmission time interval (TTI)) may be differently configured for the aggregated cells. Here, the symbol may include an OFDM symbol (or cyclic prefix-OFDM (CP-OFDM) symbol) and an SC-FDMA symbol (or discrete Fourier transform-spread-OFDM (DFT-s-OFDM) symbol). In the present disclosure, the symbol, the OFDM-based symbol, the OFDM symbol, the CP-OFDM symbol, and the DFT-s-OFDM symbol are used interchangeably.

Referring to FIG. 4, in the NR system, UL and DL transmissions are organized into frames. Each frame has a duration of $T_f=(\Delta f_{max}*N_f/100)*T_c=10$ ms and is divided into two half-frames of 5 ms each. A basic time unit for NR is $T_c=1/(\Delta f_{max}*N_f)$ where $\Delta f_{max}=480*10^3$ Hz and $N_f=4096$. For reference, a basic time unit for LTE is $T_s=1/(\Delta f_{ref}*N_{f,ref})$ where $\Delta f_{ref}=15*10^3$ Hz and $N_{f,ref}=2048$. $T_c$ and $T_f$ have the relationship of a constant $\kappa=T_c/T_f=64$. Each half-frame includes 5 subframes and a duration $T_{sf}$ of a single subframe is 1 ms. Subframes are further divided into slots and the number of slots in a subframe depends on a subcarrier spacing. Each slot includes 14 or 12 OFDM symbols based on a cyclic prefix. In a normal CP, each slot includes 14 OFDM symbols and, in an extended CP, each slot includes 12 OFDM symbols. The numerology depends on an exponentially scalable subcarrier spacing $\Delta f=2^u*15$ kHz. The table below shows the number of OFDM symbols ($N^{slot}_{symb}$) per slot, the number of slots ($N^{frame,u}_{slot}$) per frame, and the number of slots ($N^{subframe,u}_{slot}$) per subframe.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The table below shows the number of OFDM symbols per slot, the number of slots per frame, and the number of slots per subframe, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

For a subcarrier spacing configuration u, slots may be indexed within a subframe in ascending order as follows: $n^u_s \in \{0, \ldots, n^{subframe,u}_{slot}-1\}$ and indexed within a frame in ascending order as follows: $n^u_{s,f} \in \{0, \ldots, n^{subframe,u}_{slot}-1\}$.

Figure 5:
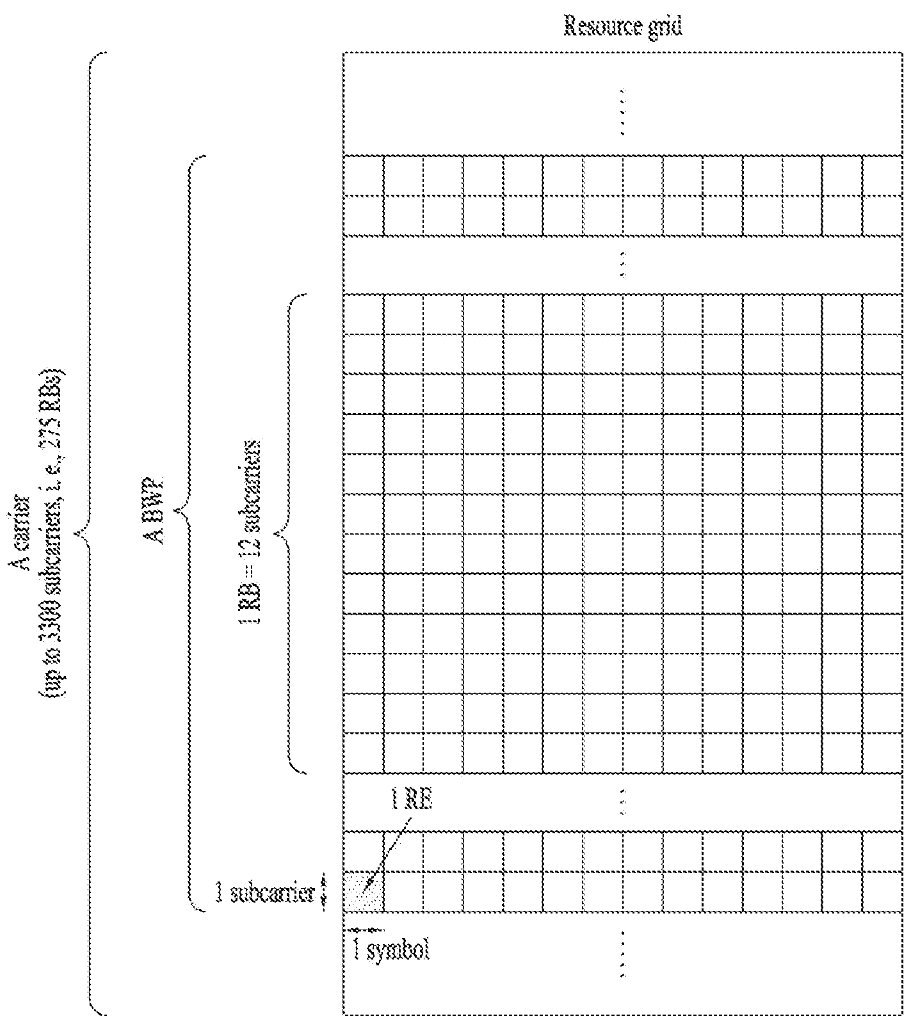
FIG. 5 illustrates a resource grid of a slot.
Figure 6:
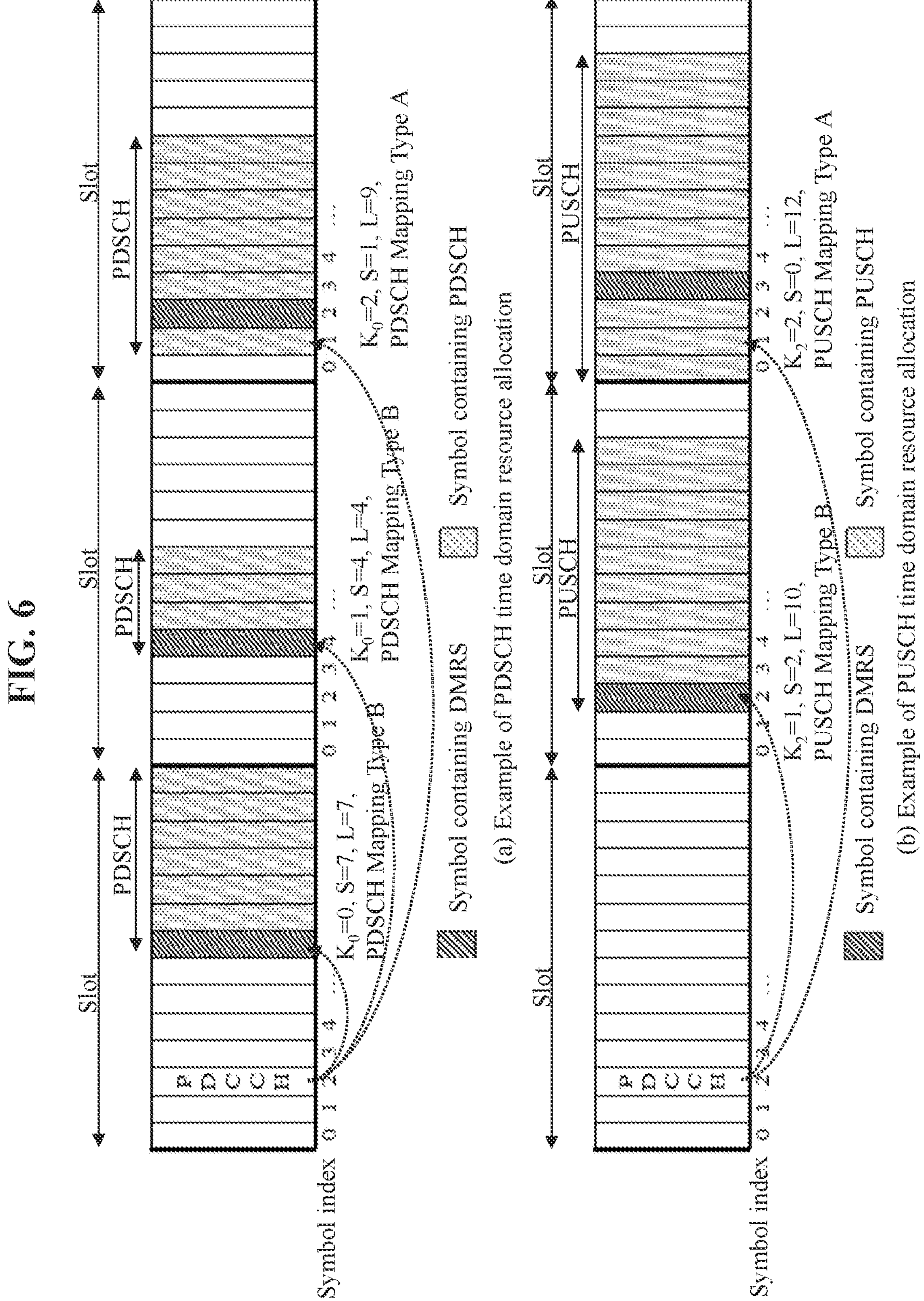
FIG. 6 illustrates an example of physical downlink shared channel (PDSCH) time domain resource assignment (TDRA) caused by a physical downlink control channel (PDCCH) and an example of physical uplink shared channel (PUSCH) TDRA caused by the PDCCH.

FIG. 5 illustrates a resource grid of a slot. The slot includes multiple (e.g., 14 or 12) symbols in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at a common resource block (CRB) $N^{start,u}_{grid}$ indicated by higher layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP-based wireless communication system, $N^{RB}_{sc}$ is typically 12. There is one resource grid for a given antenna port p, a subcarrier spacing configuration u, and a transmission link (DL or UL). The carrier bandwidth $N^{size,u}_{grid}$ for the subcarrier spacing configuration u is given to the UE by a higher layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the NR system, an RB is defined by 12 consecutive subcarriers in the frequency domain. In the NR system, RBs are classified into CRBs and physical resource blocks (PRBs). The CRBs are numbered from 0 upwards in the frequency domain for the subcarrier spacing configuration w. The center of subcarrier 0 of CRB 0 for the subcarrier spacing configuration a is equal to 'Point A' which serves as a common reference point for RB grids. The PRBs for subcarrier spacing configuration u are defined within a bandwidth part (BWP) and numbered from 0 to $N^{size,u}_{BWP,i}-1$, where i is a number of the BWP. The relation between a PRB $n_{PRB}$ in a BWP i and a CRB $n^{u}_{CRB}$ is given by: $n^{u}_{PRB}=n^{u}_{CRB}+N^{size,u}_{BWP,i}$, where $N^{size}_{BWP,i}$ is a CRB in which the BWP starts relative to CRB 0. The BWP includes a plurality of consecutive RBs in the frequency domain. For example, the BWP may be a subset of contiguous CRBs defined for a given numerology $u_i$ in the BWP i on a given carrier. A carrier may include a maximum of N (e.g., 5) BWPs. The UE may be configured to have one or more BWPs on a given component carrier. Data communication is performed through an activated BWP and only a predetermined number of BWPs (e.g., one BWP) among BWPs configured for the UE may be active on the component carrier.

For each serving cell in a set of DL BWPs or UL BWPs, the network may configure at least an initial DL BWP and one (if the serving cell is configured with uplink) or two (if supplementary uplink is used) initial UL BWPs. The network may configure additional UL and DL BWPs. For each DL BWP or UL BWP, the UE may be provided the following parameters for the serving cell: i) an SCS; ii) a CP; iii) a CRB $N^{start}_{BWP}=O_{carrier}+RB_{start}$ and the number of contiguous RBs $N^{size}_{BWP}=L_{RB}$ provided by an RRC parameter locationAndBandwidth, which indicates an offset $RB_{set}$ and a length $L_{RB}$ as a resource indicator value (RIV) on the assumption of $N^{start}_{BWP}=275$, and a value $O_{carrier}$ provided by an RRC parameter offsetToCarrier for the SCS; an index in the set of DL BWPs or UL BWPs: a set of BWP-common parameters; and a set of BWP-dedicated parameters.

Virtual resource blocks (VRBs) may be defined within the BWP and indexed from 0 to $N^{size,u}_{BWP,i}-1$, where i denotes a BWP number. The VRBs may be mapped to PRBs according to non-interleaved mapping. In some implementations, VRB n may be mapped to PRB n for non-interleaved VRB-to-PRB mapping.

The UE for which carrier aggregation is configured may be configured to use one or more cells. If the UE is configured with a plurality of serving cells, the UE may be configured with one or multiple cell groups. The UE may also be configured with a plurality of cell groups associated with different BSs. Alternatively, the UE may be configured with a plurality of cell groups associated with a single BS. Each cell group of the UE includes one or more serving cells and includes a single PUCCH cell for which PUCCH resources are configured. The PUCCH cell may be a Pcell or an Scell configured as the PUCCH cell among Scells of a corresponding cell group. Each serving cell of the UE belongs to one of cell groups of the UE and does not belong to a plurality of cells.

NR frequency bands are defined as two types of frequency ranges, i.e., FR1 and FR2. FR2 is also referred to as millimeter wave (mmW). The following table shows frequency ranges within which NR may operate.

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Hereinafter, physical channels that may be used in the 3GPP-based wireless communication system will be described in detail.

A PDCCH carries DCI. For example, the PDCCH (i.e., DCI) carries information about transport format and resource allocation of a downlink shared channel (DL-SCH), information about resource allocation of an uplink shared channel (UL-SCH), paging information about a paging channel (PCH), system information about the DL-SCH, information about resource allocation for a control message, such as a random access response (RAR) transmitted on a PDSCH, of a layer (hereinafter, higher layer) positioned higher than a physical layer among protocol stacks of the UE/BS, a transmit power control command, information about activation/deactivation of configured scheduling (CS), etc. DCI including resource allocation information on the DL-SCH is called PDSCH scheduling DCI, and DCI including resource allocation information on the UL-SCH is called PUSCH scheduling DCI. The DCI includes a cyclic redundancy check (CRC). The CRC is masked/scrambled with various identifiers (e.g., radio network temporary identifier (RNTI)) according to an owner or usage of the PDCCH For example, if the PDCCH is for a specific UE, the CRS is masked with a UE identifier (e.g., cell-RNTI (C-RNTI)). If the PDCCH is for a paging message, the CRC is masked with a paging RNTI (P-RNTI). If the PDCCH is for system information (e.g., system information block (SIB)), the CRC is masked with a system information RNTI (SI-RNTI). If the PDCCH is for a random access response, the CRC is masked with a random access-RNTI (RA-RNTI).

When a PDCCH on one serving cell schedules a PDSCH or a PUSCH on another serving cell, it is referred to cross-carrier scheduling. Cross-carrier scheduling with a carrier indicator field (CIF) may allow a PDCCH on a serving cell to schedule resources on another serving cell. When a PDSCH on a serving cell schedules a PDSCH or a PUSCH on the serving cell, it is referred to as self-carrier scheduling. When the cross-carrier scheduling is used in a cell, the BS may provide information about a cell scheduling the cell to the UE. For example, the BS may inform the UE whether a serving cell is scheduled by a PDCCH on another (scheduling) cell or scheduled by the serving cell. If the serving cell is scheduled by the other (scheduling) cell, the BS may inform the UE which cell signals DL assignments and UL grants for the serving cell. In the present disclosure, a cell carrying a PDCCH is referred to as a scheduling cell, and a cell where transmission of a PUSCH or a PDSCH is scheduled by DCI included in the PDCCH, that is, a cell carrying the PUSCH or PDSCH scheduled by the PDCCH is referred to as a scheduled cell.

A PDSCH is a physical layer UL channel for UL data transport. The PDSCH carries DL data (e.g., DL-SCH transport block) and is subjected to modulation such as quadrature phase shift keying (QPSK), 16 quadrature amplitude modulation (QAM), 64 QAM, 256 QAM, etc. A codeword is generated by encoding a transport block (TB). The PDSCH may carry a maximum of two codewords. Scrambling and modulation mapping per codeword may be performed and modulation symbols generated from each codeword may be mapped to one or more layers. Each layer is mapped to a radio resource together with a DMRS and generated as an OFDM symbol signal. Then, the OFDM symbol signal is transmitted through a corresponding antenna port.

A PUCCH is a physical layer UL channel for uplink control information (UCI) transmission. The PUCCH carries UCI. UCI types transmitted on the PUCCH include hybrid automatic repeat request acknowledgement (HARQ-ACK) information, a scheduling request (SR), and channel state information (CSI). UCI bits include HARQ-ACK information bits if present, SR information bits if present, link recovery request (LRR) information bits if present, and CSI bits if present. In the present disclosure, HARQ-ACK information bits correspond to a HARQ-ACK codebook. In particular, a bit sequence in which HARQ-ACK information bits are arranged according to a predetermined rule is called a HARQ-ACK codebook.

- Scheduling request (SR): Information that is used to request a UL-SCH resource.
- Hybrid automatic repeat request (HARQ)-acknowledgment (ACK): A response to a DL data packet (e.g., codeword) on the PDSCH. HARQ-ACK indicates whether the DL data packet has been successfully received by a communication device. In response to a single codeword, 1-bit HARQ-ACK may be transmitted. In response to two codewords, 2-bit HARQ-ACK may be transmitted. The HARQ-ACK response includes positive ACK (simply, ACK), negative ACK (NACK), discontinuous transmission (DTX), or NACK/DTX. Here, the term HARQ-ACK is used interchangeably with HARQ ACK/NACK, ACK/NACK, or A/N.
- Channel state information (CSI): Feedback information about a DL channel. The CSI may include channel quality information (CQI), a rank indicator (RI), a precoding matrix indicator (PMI), a CSI-RS resource indicator (CRI), an SS/PBCH resource block indicator (SSBRI), and a layer indicator (L1). The CSI may be classified into CSI part 1 and CSI part 2 according to UCI type included in the CSI For example, the CRI, RI, and/or the CQI for the first codeword may be included in CSI part 1, and LI, PMI, and/or the CQI for the second codeword may be included in CSI part 2.
- Link recovery request (LRR)

In the present disclosure, for convenience, PUCCH resources configured/indicated for/to the UE by the BS for HARQ-ACK, SR, and CSI transmission are referred to as a HARQ-ACK PUCCH resource, an SR PUCCH resource, and a CSI PUCCH resource, respectively.

PUCCH formats may be defined as follows according to UCI payload sizes and/or transmission lengths (e.g., the number of symbols included in PUCCH resources). In regard to the PUCCH formats, reference may also be made to Table 4.

(0) PUCCH Format 0 (PF0 or F0)

- Supported UCI payload size: up to K bits (e.g., K=2)
- Number of OFDM symbols constituting a single PUCCH: 1 to X symbols (e.g., X=2)
- Transmission structure: Only a UCI signal without a DMRS is included in PUCCH format 0. The UE transmits a UCI state by selecting and transmitting one of a plurality of sequences. For example, the UE transmits specific UCI to the BS by transmitting one of a plurality of sequences through a PUCCH, which is PUCCH format 0. The UE transmits the PUCCH, which is PUCCH format 0, in PUCCH resources for a corresponding SR configuration only upon transmitting a positive SR.
- Configuration for PUCCH format 0 includes the following parameters for a corresponding PUCCH resource: an index for initial cyclic shift, the number of symbols for PUCCH transmission, and/or the first symbol for PUCCH transmission.

(1) PUCCH Format 1 (PF1 or F1)

- Supported UCI payload size: up to K bits (e.g., K=2)
- Number of OFDM symbols constituting a single PUCCH. Y to Z symbols (e.g., Y=4 and Z=14)
- Transmission structure: The DMRS and UCI are configured/mapped in TDM in/to different OFDM symbols. In other words, the DMRS is transmitted in symbols in which modulation symbols are not transmitted and the UCI is represented as the product between a specific sequence (e.g., orthogonal cover code (OCC)) and a modulation (e.g., QPSK) symbol. Code division multiplexing (CDM) is supported between a plurality of PUCCH resources (conforming to PUCCH format 1) (within the same RB) by applying cyclic shifts (CSs)/OCCs to both the UCI and the DMRS. PUCCH format 1 carries the UCI of up to 2 bits and the modulation symbols are spread by the OCC (differently configured depending on whether frequency hopping is performed) in the time domain.
- Configuration for PUCCH format 1 includes the following parameters for a corresponding PUCCH resource: an index for initial cyclic shift, the number of symbols for PUCCH transmission, the first symbol for PUCCH transmission, and/or an index for the OCC.

(2) PUCCH Format 2 (PF2 or F2)

- Supported UCI payload size: more than K bits (e.g., K=2)
- Number of OFDM symbols constituting a single PUCCH: 1 to X symbols (e.g., X=2)
- Transmission structure: The DMRS and UCI are configured/mapped using frequency division multiplexing (FDM) within the same symbol. The UE transmits the UCI by applying only IFFT without DFT to encoded UCI bits. PUCCH format 2 carries UCI of a larger bit size than K bits and modulation symbols are subjected to FDM with the DMRS, for transmission. For example, the DMRS is located in symbol indexes #1, #4, #7, and #10 within a given RB with the density of ⅓. A pseudo noise (PN) sequence is used for a DMRS sequence. Frequency hopping may be activated for 2-symbol PUCCH format 2.

Configuration for PUCCH format 2 includes the following parameters for a corresponding PUCCH resource: the number of PRBs, the number of symbols for PUCCH transmission, and/or the first symbol for PUCCH transmission.

(3) PUCCH Format 3 (PF3 or F3)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. The UE transmits the UCI by applying DFT to encoded UCI bits. PUCCH format 3 does not support UE multiplexing for the same time-frequency resource (e.g., same PRB).

Configuration for PUCCH format 3 includes the following parameters for a corresponding PUCCH resource: the number of PRBs, the number of symbols for PUCCH transmission, and/or the first symbol for PUCCH transmission.

(4) PUCCH Format 4 (PF4 or F4)

Supported UCI payload size: more than K bits (e.g., K=2)

Number of OFDM symbols constituting a single PUCCH: Y to Z symbols (e.g., Y=4 and Z=14)

Transmission structure: The DMRS and UCI are configured/mapped in TDM for/to different OFDM symbols. PUCCH format 4 may multiplex up to 4 UEs in the same PRB, by applying an OCC at the front end of DFT and applying a CS (or interleaved FDM (IFDM) mapping) to the DMRS. In other words, modulation symbols of the UCI are subjected to TDM with the DMRS, for transmission.

Configuration for PUCCH format 4 includes the following parameters for a corresponding PUCCH resource: the number of symbols for PUCCH transmission, length for the OCC, an index for the OCC, and the first symbol for PUCCH transmission.

The table below shows the PUCCH formats. The PUCCH formats may be divided into short PUCCH formats (formats 0 and 2) and long PUCCH formats (formats 1, 3, and 4) according to PUCCH transmission length.

TABLE 4

| PUCCH format | Length in OFDM symbols $N^{PUCCH}_{symb}$ | Number of bits | Usage | Etc. |
|---|---|---|---|---|
| 0 | 1-2 | =<2 | HARQ, SR | Sequence selection |
| 1 | 4-14 | =<2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM(no UE multiplexing) |
| 4 | 4-14 | >2 | HARQ, CSI, [SR] | DFT-s-OFDM(Pre DFT OCC) |

A PUCCH resource may be determined according to a UCI type (e.g., A/N, SR, or CSI). A PUCCH resource used for UCI transmission may be determined based on a UCI (payload) size. For example, the BS may configure a plurality of PUCCH resource sets for the UE, and the UE may select a specific PUCCH resource set corresponding to a specific range according to the range of the UCI (payload) size (e.g., numbers of UCI bits). For example, the UE may select one of the following PUCCH resource sets according to the number of UCI bits, $N_{UCI}$.

PUCCH resource set #0, if the number of UCI bits=<2

PUCCH resource set #1, if 2< the number of UCI bits=<$N_1$

PUCCH resource set #(K−1), if $N_{K-2}$< the number of UCI bits=<$N_{K-1}$

Here, K represents the number of PUCCH resource sets (K>1) and $N_i$ represents a maximum number of UCI bits supported by PUCCH resource set #i. For example, PUCCH resource set #1 may include resources of PUCCH formats 0 to 1, and the other PUCCH resource sets may include resources of PUCCH formats 2 to 4 (see Table 4).

Configuration for each PUCCH resource includes a PUCCH resource index, a start PRB index, and configuration for one of PUCCH format 0 to PUCCH format 4. The UE is configured with a code rate for multiplexing HARQ-ACK, SR, and CSI report(s) within PUCCH transmission using PUCCH format 2, PUCCH format 3, or PUCCH format 4, by the BS through a higher layer parameter maxCodeRate. The higher layer parameter maxCodeRate is used to determine how to feed back the UCI on PUCCH resources for PUCCH format 2, 3, or 4.

If the UCI type is SR and CSI, a PUCCH resource to be used for UCI transmission in a PUCCH resource set may be configured for the UE through higher layer signaling (e.g., RRC signaling). If the UCI type is HARQ-ACK for a semi-persistent scheduling (SPS) PDSCH, the PUCCH resource to be used for UCI transmission in the PUCCH resource set may be configured for the UE through higher layer signaling (e.g., RRC signaling). On the other hand, if the UCI type is HARQ-ACK for a PDSCH scheduled by DCI, the PUCCH resource to be used for UCI transmission in the PUCCH resource set may be scheduled by the DCI.

In the case of DCI-based PUCCH resource scheduling, the BS may transmit the DCI to the UE on a PDCCH and indicate a PUCCH resource to be used for UCI transmission in a specific PUCCH resource set by an ACK/NACK resource indicator (ARI) in the DCI. The ARI may be used to indicate a PUCCH resource for ACK/NACK transmission and also be referred to as a PUCCH resource indicator (PRI). Here, the DCI may be used for PDSCH scheduling and the UCI may include HARQ-ACK for a PDSCH. The BS may configure a PUCCH resource set including a larger number of PUCCH resources than states representable by the ARI by (UE-specific) higher layer (e.g., RRC) signaling for the UE. The ARI may indicate a PUCCH resource subset of the PUCCH resource set and which PUCCH resource in the indicated PUCCH resource subset is to be used may be determined according to an implicit rule based on transmission resource information about the PDCCH (e.g., the starting CCE index of the PDCCH).

For UL-SCH data transmission, the UE should include UL resources available for the UE and, for DL-SCH data reception, the UE should include DL resources available for the UE. The UL resources and the DL resources are assigned to the UE by the BS through resource allocation. Resource allocation may include time domain resource allocation (TDRA) and frequency domain resource allocation (FDRA). In the present disclosure, UL resource allocation is also referred to as a UL grant and DL resource allocation is referred to as DL assignment. The UL grant is dynamically received by the UE on the PDCCH or in RAR or semi-persistently configured for the UE by the BS through RRC signaling. DL assignment is dynamically received by the UE on the PDCCH or semi-persistently configured for the UE by the BS through RRC signaling.

On UL, the BS may dynamically allocate UL resources to the UE through PDCCH(s) addressed to a cell radio network temporary Identifier (C-RNTI). The UE monitors the PDCCH(s) in order to discover possible UL grant(s) for UL transmission. The BS may allocate the UL resources using a configured grant to the UE. Two types of configured grants, Type 1 and Type 2, may be used. In Type 1, the BS directly provides the configured UL grant (including periodicity) through RRC signaling. In Type 2, the BS may configure a periodicity of an RRC-configured UL grant through RRC signaling and signal, activate, or deactivate the configured UL grant through the PDCCH addressed to a configured scheduling RNTI (CS-RNTI). For example, in Type 2, the PDCCH addressed to the CS-RNTI indicates that the corresponding UL grant may be implicitly reused according to the configured periodicity through RRC signaling until deactivation.

On DL, the BS may dynamically allocate DL resources to the UE through PDCCH(s) addressed to the C-RNTI. The UE monitors the PDCCH(s) in order to discover possible DL grant(s). The BS may allocate the DL resources to the UE using SPS. The BS may configure a periodicity of configured DL assignment through RRC signaling and signal, activate, or deactivate the configured DL assignment through the PDCCH addressed to the CS-RNTI. For example, the PDCCH addressed to the CS-RNTI indicates that the corresponding DL assignment may be implicitly reused according to the configured periodicity through RRC signaling until deactivation.

Hereinafter, resource allocation by the PDCCH and resource allocation by RRC will be described in more detail.

Resource Allocation by PDCCH: dynamic grant/assignment

The PDCCH may be used to schedule DL transmission on the PDSCH and UL transmission on the PUSCH. DCI on the PDCCH for scheduling DL transmission may include DL resource assignment that at least includes a modulation and coding format (e.g., modulation and coding scheme (MCS)) index/Mcs), resource allocation, and HARQ information, associated with a DL-SCH. DCI on the PDCCH for scheduling UL transmission may include a UL scheduling grant that at least includes a modulation and coding format, resource allocation, and HARQ information, associated with a UL-SCH. HARQ information on a DL-SCH or UL-SCH may include a new information indicator (NDI), transport block size (TBS), redundancy version (RV), and HARQ process ID (i.e., HARQ process number). The size and usage of the DCI carried by one PDCCH differs according to a DCI format. For example, DCI format 0_0, DCI format 0_1, or DCI format 0_2 may be used to schedule the PUSCH, and DCI format 1_0, DCI format 1_1, or DCI format 1_2 may be used to schedule the PDSCH. Particularly, DCI format 0_2 and DCI format 1_2 may be used to schedule transmission having higher transmission reliability and lower latency requirements than transmission reliability and latency requirement guaranteed by DCI format 0_0, DCI format 0_1, DCI format 1_0, or DCI format 1_1. Some implementations of the present disclosure may be applied to UL data transmission based on DCL format 0_2. Some implementations of the present disclosure may be applied to DL data reception based on DCI format 1_2.

Figure 7:
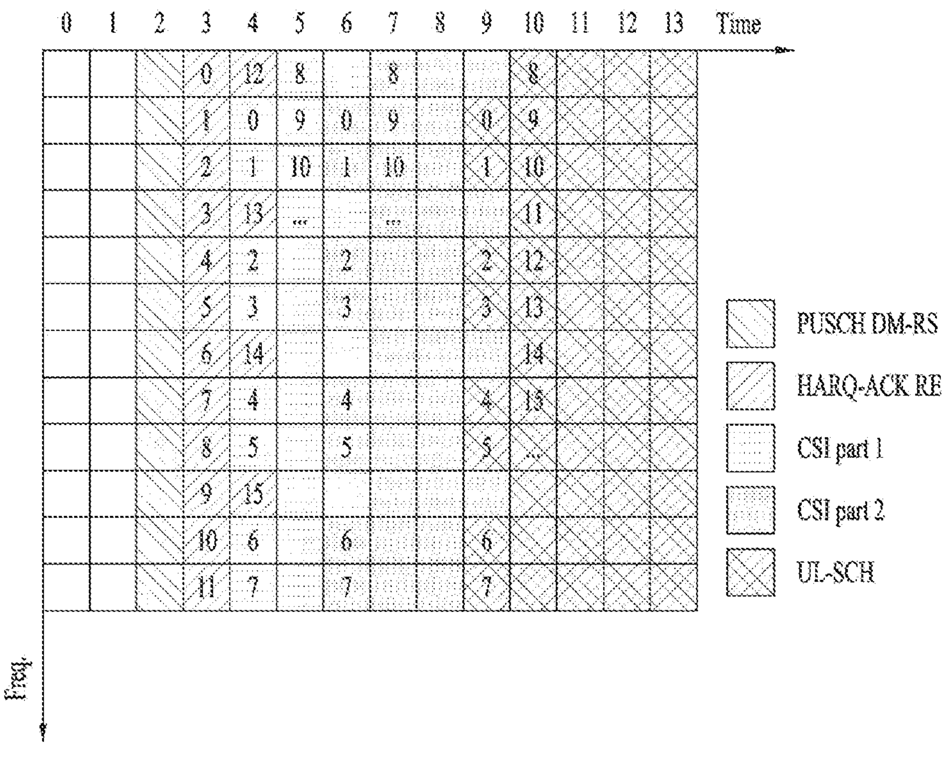
FIG. 7 illustrates an example of multiplexing uplink control information (UCI) with a PUSCH.

FIG. 7 illustrates an example of PDSCH TDRA caused by a PDCCH and an example of PUSCH TDRA caused by the PDCCH.

DCI carried by the PDCCH in order to schedule a PDSCH or a PUSCH includes a TDRA field. The TDRA field provides a value m for a row index m+1 to an allocation table for the PDSCH or the PUSCH. Predefined default PDSCH time domain allocation is applied as the allocation table for the PDSCH or a PDSCH TDRA table that the BS configures through RRC signaled pdsch-TimeDomainAllocationList is applied as the allocation table for the PDSCH. Predefined default PUSCH time domain allocation is applied as the allocation table for the PUSCH or a PUSCH TDRA table that the BS configures through RRC signaled pusch-TimeDomainAllocationList is applied as the allocation table for the PUSCH. The PDSCH TDRA table to be applied and/or the PUSCH TDRA table to be applied may be determined according a fixed/predefined rule (e.g., refer to 3GPP TS 38.214).

In PDSCH time domain resource configurations, each indexed row defines a DL assignment-to-PDSCH slot offset $K_0$, a start and length indicator value SLIV (or directly, a start position (e.g., start symbol index S) and an allocation length (e.g., the number of symbols, L) of the PDSCH in a slot), and a PDSCH mapping type. In PUSCH time domain resource configurations, each indexed row defines a UL grant-to-PUSCH slot offset $K_2$, a start position (e.g., start symbol index S) and an allocation length (e.g., the number of symbols, L) of the PUSCH in a slot, and a PUSCH mapping type. $K_0$ for the PDSCH and $K_2$ for the PUSCH indicate the difference between the slot with the PDCCH and the slot with the PDSCH or PUSCH corresponding to the PDCCH. SLIV denotes a joint indicator of the start symbol S relative to the start of the slot with the PDSCH or PUSCH and the number of consecutive symbols, L, counting from the symbol S. There are two PDSCH/PUSCH mapping types: one is mapping type A and the other is mapping type B. In the case of PDSCH/PUSCH mapping type A, a DMRS is mapped to a PDSCH/PUSCH resource with respect to the start of a slot. One or two of the symbols of the PDSCH/PUSCH resource may be used as DMRS symbol(s) according to other DMRS parameters. For example, in the case of PDSCH/PUSCH mapping type A, the DMRS is located in the third symbol (symbol #2) or the fourth symbol (symbol #3) in the slot according to RRC signaling. In the case of PDSCH/PUSCH mapping type B, a DMRS is mapped with respect to the first OFDM symbol of a PDSCH/PUSCH resource. One or two symbols from the first symbol of the PDSCH/PUSCH resource may be used as DMRS symbol(s) according to other DMRS parameters. For example, in the case of PDSCH/PUSCH mapping type B, the DMRS is located at the first symbol allocated for the PDSCH/PUSCH. In the present disclosure, the PDSCH/PUSCH mapping type may be referred to as a mapping type or a DMRS mapping type. For example, in the present disclosure, PUSCH mapping type A may be referred to as mapping type A or DMRS mapping type A, and PUSCH mapping type B may be referred to as mapping type B or DMRS mapping type B.

The scheduling DCI includes an FDRA field that provides assignment information about RBs used for the PDSCH or the PUSCH. For example, the FDRA field provides information about a cell for PDSCH or PUSCH transmission to the UE, information about a BWP for PDSCH or PUSCH transmission, and/or information about RBs for PDSCH or PUSCH transmission.

Resource Allocation by RRC

As mentioned above, there are two types of transmission without dynamic grant: configured grant Type 1 and configured grant Type 2. In configured grant Type 1, a UL grant is provided by RRC and stored as a configured UL grant. In configured grant Type 2, the UL grant is provided by the PDCCH and stored or cleared as the configured UL grant based on L1 signaling indicating configured UL grant activation or deactivation. Type 1 and Type 2 may be configured by RRC per serving cell and per BWP. Multiple configurations may be active simultaneously on different serving cells.

When configured grant Type 1 is configured, the UE may be provided with the following parameters through RRC signaling:

cs-RNTI corresponding to a CS-RNTI for retransmission;

periodicity corresponding to a periodicity of configured grant Type 1;

timeDomainOffset indicating an offset of a resource with respect to system frame number (SFN)=0 in the time domain;

timeDomainAllocation value m that provides a row index m+1 pointing to the allocation table, indicating a combination of the start symbol S, the length L, and the PUSCH mapping type;

frequencyDomainAllocation that provides frequency domain resource allocation; and mcsAndTBS that provides $I_{MCS}$ indicating a modulation order, a target code rate, and a transport block size.

Upon configuration of configured grant Type 1 for a serving cell by RRC, the UE stores the UL grant provided by RRC as a configured UL grant for an indicated serving cell and initializes or re-initializes the configured UL grant to start in a symbol according to timeDomainOffset and S (derived from SLIV) and to recur with periodicity. After the UL grant is configured for configured grant Type 1, the UE may consider that the UL grant recurs in association with each symbol satisfying: [(SFN*numberOfSlotsPerFrame (monberOfSymbolsPerSlot)+ (slot number in the frame*numberOfSymbolsPerSlot)+symbol number in the slot]=(timeDomainOffset*numberOfSymbolsPerSlot+S+N*periodicity) modulo (1024*number OfSlotsPerFrame*numberOfSymbolsPerSlot), for all N>=0, where numberOfSlotsPerFrame and numberOfSymbolsPerSlot indicate the number of consecutive slots per frame and the number of consecutive OFDM symbols per slot, respectively (refer to Table 1 and Table 2).

For configured grant Type 2, the UE may be provided with the following parameters by the BS through RRC signaling:

cs-RNTI corresponding to a CS-RNTI for activation, deactivation, and retransmission; and periodicity that provides a periodicity of configured grant Type 2.

An actual UL grant is provided to the UE by the PDCCH (addressed to the CS-RNTI). After the UL grant is configured for configured grant Type 2, the UE may consider that the UL grant recurs in association with each symbol satisfying: [(SFN*numberOfSlotsPerFrame*numberOfSymbolsPerSlot)+(slot number in the frame*numberOfSymbolsPerSlot)+symbol number in the slot]=[($SFN_{start\ time}$*numberOfSlotsPerFrame*numberOfSymbolsPerSlot+$slot_{start\ time}$*numberOfSymbolsPerSlot+$symbol_{start\ time}$)+N*periodicity] modulo (1024*number OfSlotsPerFrame*numberOfSymbolsPerSlot), for all N>=0, where $SFN_{start\ time}$, $slot_{start\ time}$, and $symbol_{start\ time}$ represent an SFN, a slot, and a symbol, respectively, of the first transmission opportunity of the PUSCH after the configured grant is (re-) initialized, and numberOfSlotsPerFrame and numberOfSymbolsPerSlot indicate the number of consecutive slots per frame and the number of consecutive OFDM symbols per slot, respectively (refer to Table 1 and Table 2).

In some scenarios, a parameter harq-ProcID-Offset and/or a parameter harq-ProcID)-Offset2 used to derive HARQ process IDs for configured UL grants may be further provided by the BS to the UE. harq-ProcID-Offset is an offset of a HARQ process for a configured grant for operation with shared spectrum channel access, and harq-ProcID-Offset2 is an offset of a HARQ process for a configured grant. In the present disclosure, cg-Retransmission Timer is a duration after (re) transmission based on a configured grant in which the UE should not autonomously perform retransmission based on the HARQ process of the (re) transmission. eg-Retransmission Timer may be provided to the UE by the BS when retransmission on a configured UL grant is configured. For configured grants configured with neither harq-ProcID-Offset nor cg-RetransmissionTimer, the HARQ process ID associated with the first symbol of UL transmission may be derived from the following equation: HARQ Process ID=[floor (CURRENT_symbol/periodicity)] modulo nrofHARQ-Processes. For configured UL grants with harq-ProcID-Offset2, the HARQ process ID associated with the first symbol of UL transmission may be derived from the following equation: HARQ Process ID=[floor (CURRENT_symbol/periodicity)] modulo nrofHARQ-Processes+harq-ProcID-Offset2, where CURRENT_symbol=(SFN*numberOfSlotsPerFrame*numberOfSymbolsPerSlot+slot number in the frame*numberOfSymbolsPerSlot+symbol number in the slot), and memberOfSlotsPerFrame and numberOfSymbolsPerSlot denote the number of consecutive slots per frame and the number of consecutive OFDM symbols per slot, respectively. For configured UL grants with cg-Retransmission Timer, the UE may select a HARQ process ID from among HARQ process IDs available for the configured grant configuration.

On DL, the UE may be configured with semi-persistent scheduling (SPS) per serving cell and per BWP by RRC signaling from the BS. For DL SPS, DL assignment is provided to the UE by the PDCCH and stored or cleared based on L1 signaling indicating SPS activation or deactivation. When SPS is configured, the UE may be provided with the following parameters by the BS through RRC signaling (e.g., SPS configuration) used to configure a semi-persistent transmission:

cs-RNTI corresponding to a CS-RNTI for activation, deactivation, and retransmission;

nrofHARQ-Processes that provides the number of HARQ processes for SPS;

periodicity that provides a periodicity of configured DL assignment for SPS;

nIPUCCH-AN that provides a HARQ resource for a PUCCH for SPS (the network configures the HARQ resource as format 0 or format 1, and the actual PUCCH resource is configured by PUCCH-Config and referred to in nIPUCCH-AN by the ID thereof).

Multiple DL SPS configurations may be configured within the BWP of a serving cell. After DL assignment is configured for SPS, the UE may consider sequentially that N-th DL assignment occurs in a slot satisfying: (numberOfSlotsPerFrame*SFN+slot number in the frame)=[(numberOfSlotsPerFrame*$SFN_{start\ time}$+$slot_{start\ time}$)+N*periodicity*numberOfSlotsPerFrame/10] modulo (1024*manberOfSlotsPerFrame), where $SFN_{start\ time}$ and $slot_{start\ time}$ represent an SFN and a slot, respectively, of first transmission of the PDSCH after configured DL assignment is (re-) initialized, and memberOfSlotsPerFrame and memberOfSymbolsPerSlot indicate the number of consecutive slots per frame and the number of consecutive OFDM symbols per slot, respectively (refer to Table 1 and Table 2).

In some scenarios, a parameter harq-ProcID-Offset used to derive HARQ process IDs for configured DL assignments may be further provided by the BS to the UE. harq-ProcID-Offset is an offset of a HARQ process for SPS. For configured DL assignments without harq-ProcID)-Offset, a HARQ process ID associated with a slot in which DL transmission starts may be determined from the following equation: HARQ Process ID=[floor (CURRENT_slot*10/(mnumberOfSlotsPerFrame*periodicity))] modulo nrof-HARQ-Processes, where CURRENT_slot=[(SFN*memberOfSlotsPerFrame)+slot number in the frame], and numberOfSlotsPerFrame denotes the number of consecutive slots per frame. For configured DL assignments with harq-ProcID-Offset, a HARQ process ID associated with a slot in which DL transmission starts may be determined from the following equation: HARQ Process ID=[floor (CURRENT_slot/periodicity)] modulo nrofHARQ-Processes+harq-ProcID-Offset, where CURRENT_slot=[(SFN*numberOfSlotsPerFrame)+slot number in the frame], and numberOfSlotsPerFrame denotes the number of consecutive slots per frame.

If the CRC of a corresponding DCI format is scrambled with the CS-RNTI provided by the RRC parameter cs-RNTI, and a new data indicator field for an enabled transport block is set to 0, the UE validates, for scheduling activation or scheduling release, a DL SPS assignment PDCCH or a configured UL grant Type 2 PDCCH. Validation of the DCI format is achieved if all fields for the DCI format are set according to Table 5 and Table 6. Table S shows an example of special fields for DL SPS and UL grant Type 2 scheduling activation PDCCH validation, and Table 6 shows an example of special fields for DL SPS and UL grant Type 2 scheduling release PDCCH validation.

TABLE 5

| | DCI format 0_0/0_1 | DCI format 1_0 | DCI format 1_1 |
|---|---|---|---|
| HARQ process number | set to all '0's | set to all '0's | set to all '0's |
| Redundancy version | set to '00' | set to '00' | For the enabled transport block: set to '00' |

TABLE 6

| | DCI format 0_0 | DCI format 1_0 |
|---|---|---|
| HARQ process number | set to all '0's | set to all '0's |
| Redundancy version | set to '00' | set to '00' |
| Modulation and coding scheme | set to all '1's | set to all '1's |
| Resource block assignment | set to all '1's | set to all '1's |

Actual DL assignment and UL grant for DL SPS or UL grant Type 2, and a corresponding MCS are provided by resource assignment fields (e.g., a TDRA field providing a TDRA value m, an FDRA field providing frequency resource block assignment, and/or an MCS field) in the DCI format carried by a corresponding DL SPS or UL grant Type 2 scheduling activation PDCCH. If validation is achieved, the UE considers information in the DCI format as valid activation or valid release of DL SPS or configured UL grant Type 2.

In the present disclosure, a PDSCH based on DL SPS may be referred to as an SPS PDSCH, and a PUSCH based on a UL configured grant (CG) may be referred to as a CG PUSCH. A PDSCH dynamically scheduled by DCI carried on a PDCCH may be referred to as a dynamic grant (DG) PDSCH, and a PUSCH dynamically scheduled by DCI carried by on a PDCCH may be referred to as a DG PUSCH.

FIG. 7 illustrates an example of multiplexing UCI with a PUSCH. When PUCCH resource(s) overlap with a PUSCH resource in a slot and simultaneous PUCCH-PUSCH transmission is not configured, UCI may be transmitted over a PUSCH as illustrated therein. Transmission of the UCI over the PUSCH is referred to as UCI piggyback or PUSCH piggyback. In particular, FIG. 7 illustrates a case where a HARQ-ACK and CSI are carried on the PUSCH resource.

The time and frequency resources that can be used by the UE to report CSI are controlled by the BS. In the 3GPP based systems, CSI may consist of the following indicators/reports: channel quality indicator (CQI), precoding matrix indicator (PMI), CSI-RS resource indicator (CRI), SS/PBCH block resource indicator (SSBRI), layer indicator (LI), rank indicator (RI), layer-1 reference signal received power (L1-RSRP) or layer-1 signal to interference and noise ratio (L1-SINR).

For CQI, PMI, CRI, SSBRI, LI, RI, L1-RSRP, L1-SINR a UE is configured by higher layer (e.g., RRC) signaling with N>=1 CSI-ReportConfig Reporting Settings, M>=1 CSI-ResourceConfig Resource Settings, and one or two list(s) of trigger states (given by the higher layer parameters CSI-AperiodicTriggerStateList and CSI-SemiPersistentOn-PUSCH-TriggerStateList). Each trigger state in CSI-Aperiodic TriggerStateList contains a list of associated CSI-ReportConfigs indicating the Resource Set IDs for channel and optionally for interference. Each trigger state in CSI-SemiPersistentOnPUSCH-TriggerStateList contains one associated CSI-ReportConfig.

Each Reporting Setting CSI-ReportConfig is associated with a single downlink BWP (indicated by higher layer parameter BWP-Id which is provided by a BS) given in the associated CSI-ResourceConfig for channel measurement and contains the parameter(s) for one CSI reporting band: codebook configuration including codebook subset restriction, time-domain behavior, frequency granularity for CQI and PMI, measurement restriction configurations, and the CSI-related quantities to be reported by the UE such as LI, L1-RSRP, L1-SINR, CRI, and SSBRI.

There are three types of reporting: periodic CSI (P-CSI) reporting, semi-persistent CSI (SP-CSI) reporting, and aperiodic CSI (A-CSI) reporting. The UE performs CSI reporting based on an RRC configuration for the CSI reporting by the BS. The reporting configuration for CSI may be aperiodic (using a PUSCH), periodic (using a PUCCH), or semi-persistent (using a PUCCH and a DCI activated PUSCH). The above time-domain behavior is indicated by a higher layer parameter reportConfigType in CSI-ReportConfig provided by the BS, which may be set as follows: 'aperiodic', 'semiPersistentOnPUCCH', 'semiPersistentOn-PUSCH', or 'periodic'.

A higher layer parameter reportQuantity in CSI-ReportConfig indicates CSI-related, L1-RSRP-related, or L1-SINR-related quantities to be reported.

Each CSI Resource Setting CSI-ResourceConfig contains a configuration of a list of S>=1 CSI Resource Sets (given by higher layer parameter csi-RS-Resource SetList), where the list is comprised of references to either or both of NZP CSI-RS resource set(s) and SS/PBCH block set(s) or the list is comprised of references to CSI-IM resource set(s) Each CSI Resource Setting is located in the DL BWP identified by the higher layer parameter BWP-id, and all CSI Resource Settings linked to a CSI Report Setting have the same DL BWP. The time domain behavior of the CSI-RS resources within a CSI Resource Setting are indicated by the higher layer parameter resource Type and can be set to aperiodic, periodic, or semi-persistent. The following are configured via higher layer signaling for one or more CSI Resource Settings for channel and interference measurement: CSI-IM resource for interference measurement, NZP CSI-RS resource for interference measurement, NZP CSI-RS resource for channel measurement.

In wireless communication systems, the BS configures an RS resource (e.g., CSI-RS resource, SSB resource, etc.) for CSI reporting to the UE. The UE performs measurement on an RS received on the configured RS resource based on the configuration or triggering of the BS and performs CSI reporting periodically or aperiodically based on the measured values.

An aperiodic CSI report carried on the PUSCH supports wideband, and sub-band frequency granularities. An aperiodic CSI report carried on the PUSCH supports Type I, Type II and Enhanced Type II CSI. Type I CSI feedback is supported for CSI Reporting on PUSCH. Type I wideband and sub-band CSI is supported for CSI Reporting on the PUSCH. Type II CSI is supported for CSI Reporting on the PUSCH. For Type I. Type II and Enhanced Type II CSI feedback on PUSCH, a CSI report may comprise of two parts. Part I has a fixed payload size and is used to identify the number of information bits in Part 2. Part I is transmitted in its entirety before Part 2.

For Type I CSI feedback, Part 1 contains RI (if reported), CRI (if reported), CQI for the first codeword (if reported). Part 2 contains PMI (if reported) and contains the CQI for the second codeword (if reported) when RI (if reported) is larger than 4.

For Type II CSI feedback, Part I contains RI (if reported), CQI, and an indication of the number of non-zero wideband amplitude coefficients per layer for the Type II CSI. The fields of Part 1-RI (if reported), CQI, and the indication of the number of non-zero wideband amplitude coefficients for each layer—are separately encoded. Part 2 contains the PMI of the Type II CSI. The elements of $i_{1,4,1}$, $i_{2,1,1}$ (if reported) and $i_{2,2,1}$ (reported) are reported in the increasing order of their indices, i=0.1 . . . , 2L−1, where the element of the lowest index is mapped to the most significant bits and the element of the highest index is mapped to the least significant bits. Part 1 and 2 are separately encoded.

For Enhanced Type II CSI feedback, Part I contains RI, CQI, and an indication of the overall number of non-zero amplitude coefficients across layers for the Enhanced Type II CSI. The fields of Part 1-RI, CQI, and the indication of the overall number of non-zero amplitude coefficients across layers—are separately encoded. Part 2 contains the PMI of the Enhanced Type II CSI. Part 1 and 2 are separately encoded.

A UE may be semi-statically configured by higher layers to perform periodic CSI reporting on the PUCCH. A UE can be configured by higher layers for multiple periodic CSI Reports corresponding to multiple higher layer configured CSI Reporting Settings, where the associated CSI Resource Settings are higher layer configured. Periodic CSI reporting on PUCCH formats 2, 3, 4 supports Type I CSI with wideband granularity. Semi-persistent CSI reporting on the PUCCH supports Type I CSI. Semi-persistent CSI reporting on the PUCCH format 2 supports Type I CSI with wideband frequency granularity. Semi-persistent CSI reporting on PUCCH formats 3 or 4 supports Type I CSI with wideband and sub-band frequency granularities and Type II CSI Part 1. When the PUCCH carry Type I CSI with wideband frequency granularity, the CSI payload carried by the PUCCH format 2 and PUCCH formats 3, or 4 are identical and the same irrespective of RI (if reported), CRI (if reported). For type I CSI sub-band reporting on PUCCH formats 3, or 4, the payload is split into two parts. The first part contains RI (if reported), CRI (if reported), CQI for the first codeword. The second part contains PMI and contains the CQI for the second codeword when RI>4.

The UE calculates CSI parameters to report based on the configuration or triggering of the BS by assuming the following dependencies between the CSI parameters:

LI is calculated conditioned on the reported CQI, PMI, RI and CRI;

CQI is calculated conditioned on the reported PMI, RI and CRI;

PMI is calculated conditioned on the reported RI and CRI;

RI is calculated conditioned on the reported CRI.

To perform CSI reporting configured or instructed to the UE, the UE needs to receive an RS for the CSI reporting and perform CSI computation based on the R.S. Thus, if the UE determines all CSI values to be included in CSI report(s) associated with PUSCH or PUCCH transmission according to its CSI reporting configurations and then performs the CSI reporting over the PUSCH or PUCCH transmission, there occurs a time delay including the CSI computation time. However, a long delay in the CSI reporting implies that a significant amount of time is required to ensure the accuracy of CSI and MCS. This may not be suitable not only for services such as URLLC that are sensitive to delays, have difficulty to predict traffic characteristics, and are sporadic but also for burst transmission that is performed within a short period of time. The reason for this is that the accuracy of the CSI and MCS is important to enhance URLLC reliability. Accordingly, there is a need for a method capable of not only reducing a delay time experienced by the UE by reducing the processing time of the UE but also performing CSI reporting with high accuracy.

In some implementations, it may be considered to reduce the amount of information that needs to be processed by transmitting only part of CSI that the UE has traditionally reported (e.g., NR Rel-16). In some implementations, the UE may perform partial CSI reporting under predetermined condition(s), that is, the UE may transmit only part of the CSI to the BS under the predetermined condition(s). However, if it is difficult for the BS to know whether the predetermined condition(s) are satisfied at the UE, the BS may not predict the total bit size of UCI to be transmitted by the UE, and as a result, the BS may encounter difficulty in decoding the UCI received from the UE.

Hereinafter, the present disclosure not only addresses issues that may arise when the UE transmits only part (e.g., CQI) of CSI to reduce the CSI processing time required by the UE but also provides solutions therefor For example, the present disclosure describes conditions under which the UE is capable of transmitting partial CSI only and some implementations in which the UE provides additional information necessary for successful CSI reception by the BS.

In the present disclosure, partial CSI reporting may refer to an operation of transmitting or updating only at least some among two or more pieces of CSI, which are transmitted by the UE according to the conventional CSI reporting. For example, the partial CSI reporting may mean that instead of transmitting a wideband/subband CQI, RI, and PMI in CSI, the UE transmits only the wideband/subband CQI. Alternatively, the partial CSI reporting may mean that the UE performs CSI reporting by updating only the CQI but using the same values as the previously transmitted ones for the remaining information. In some implementations, the information omitted due to the partial CSI reporting may not be derived because the UE does not perform processing necessary to generate the information, or the information omitted due to the partial CSI reporting may be dropped from transmission after performing the processing necessary to derive the omitted information. In some implementations of the present disclosure, if the information omitted due to the partial CSI reporting is not derived by the UE but is required to derive/generate other information that needs to be transmitted, the UE may perform the derivation/generation of the required other information based on the previously derived or transmitted information or the most recently derived or transmitted information. In some implementations of the present disclosure, specific information on which the partial CSI reporting is based (e.g., information used to derive values to be transmitted in the partial CSI reporting) may be limited to information associated with the same CSI configuration as the CSI configuration of the partial CSI reporting. In other words, the UE may derive/generate information necessary for the partial CSI reporting, based on the previously derived or transmitted information or the most recently derived or transmitted information under the same CSI configuration as that for the partial CSI reporting.

In some scenarios (e.g., NR Rel-16), when the UE loads UCI payloads on a UL resource determined (for UL multiplexing) from among given PUCCH resources, the UE may not load the entirety of generated CSI on the UL resource due to limitations in the amount of information that the determined UL resource is capable of accommodating. In this case, the UE performs CSI omission to omit some of the generated CSI on a CSI part I basis, on a CSI part 2 basis, or if necessary, on a subband basis for CSI part 2.

While the CSI omission aims to include as much information as possible in limited UL resources, the partial CSI reporting according to some implementations of the present disclosure aims to reduce the processing time by reducing information that the UE needs to generate. Therefore, unlike the CSI omission where some of the generated CSI is excluded from UCI payloads on the CSI part 1 basis, on the CSI part 2 basis, or on the subband basis for CSI part 2, partial CSI omission according to some implementations of the present disclosure includes generating only parts of a CQI/RI/PMI to be included in a CSI report. In the case of the CSI omission, if conditions according to some implementations of the present disclosure are satisfied, the UE may be provided with CSI configurations to enable the UE to generate only some of the values to be included in the CSI report. Additionally, even at the moment of CSI reporting, the UE needs to be capable of determining whether to semi-statically exclude parts of the CSI before UCI multiplexing. Considering that the purpose of the partial CSI reporting is to reduce the amount of information and thereby decrease the processing time required for CSI generation, whether to perform the partial CSI reporting needs to be determined before the CSI generation. CSI reporting may be an example of full CSI reporting in that for the CSI reporting, the UE generates CSI values that the UE is configured/instructed to report.

Figure 8:
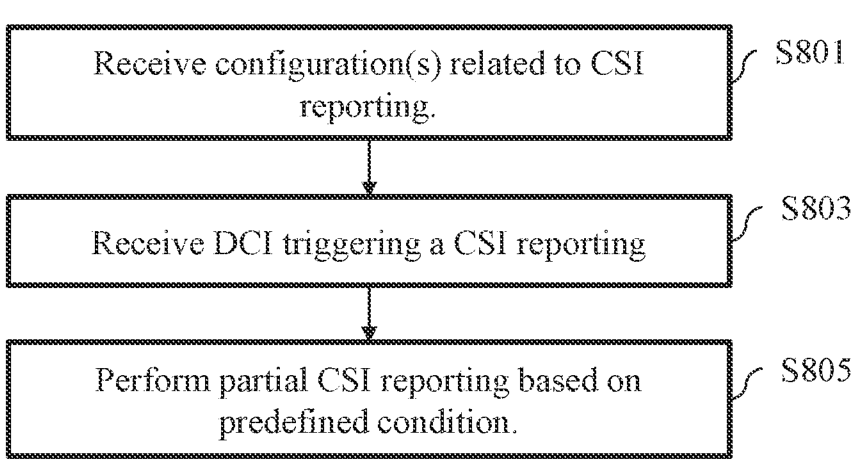
FIG. 8 illustrates an operational flow of a user equipment (UE) according to some implementations of the present disclosure.

UE Side:

FIG. 8 illustrates an operational flow of the UE according to some implementations of the present disclosure.

The UE may be configured with higher layer parameter(s) required for CSI transmission. The UE may perform partial CSI reporting only when condition(s) according to some implementations of the present disclosure are satisfied. In some implementations of the present disclosure, the following UE operation(s) may be considered.

The UE may receive one or more RRC configurations for CSI transmission from the BS (S801). The RRC configurations may be received separately for each CSI configuration (s).

The UE may receive DCI transmitted by the BS (S803). The UE may transmit CSI on a PUCCH/PUSCH resource indicated by the DCI or a PUSCH/PUCCH resource determined based on configured PUCCH resource(s) (through higher layer signaling from the BS). In this case, some implementations of the present disclosure may be used to select the corresponding PUCCH resource.

To transmit the CSI, the UE may also perform partial CSI reporting according to some implementations of the present disclosure (S805). In other words, the UE may optionally update CQI, RI, and PMI information. For example, to determine whether to perform the partial CSI reporting, the UE may consider the time-domain location of the last measurement resource to be used for CSI reporting.

The last measurement resource refers to a resource that the UE uses for the CSI reporting, which may be represented by a CSI reference resource. In some implementations of the present disclosure, the measurement resource may be a CSI-RS resource. For example, the measurement resource may be a non-zero power (NZP) CSI-RS resource and/or a CSI interference measurement (CSI-IM) resource, where the UE performs channel measurement and/or interference measurement to calculate a CQI value. Alternatively, in some implementations of the present disclosure, the measurement resource may be a CSI reference resource defined in Section 5.2.2.5 of 3GPP TS 38.214. For example, according to 3GPP TS 38.214 Rel-16, the CSI reference resource for a serving cell is defined as follows:

In the frequency domain, the CSI reference resource is defined by the group of downlink physical resource blocks corresponding to the band to which the derived CSI relates.

In the time domain, the CSI reference resource for a CSI reporting in uplink slot n' is defined by a single downlink slot n-nest ret, where $n=\text{floor}\{n'*(2\hat{}u_{DL}/2\hat{}u_{UL})\}+\text{floor}\{(n^{CA}_{slot,offset,UL}/2\hat{}u_{offset,UL})-(n^{CA}_{slot,offset,DL}/2\hat{}u_{offset,DL})\}$ and, $u_{DL}$ and $u_{UL}$ are the subcarrier spacing configurations for DL and UL, respectively, and $n^{CA}_{slot,offset}$ and $u_{offset}$ are determined by higher-layer configured ca-SlotOffset for the cells transmitting the uplink and downlink, where for periodic and semi-persistent CSI reporting if a single CSI-RS/SSB resource is configured for channel measurement $n_{CSI\_ref}$ is the smallest value greater than or equal to $4*2\hat{}u_{DL}$, such that it corresponds to a valid downlink slot, or if multiple CSI-RS/SSB resources are configured for channel measurement $n_{CSI\_ref}$ is the smallest value greater than or equal to $5*2\hat{}u_{DL}$, such that it corresponds to a valid downlink slot.

where for aperiodic CSI reporting, if the UE is indicated by the DCI to report CSI in the same slot as the CSI request, $n_{CSI\_ref}$ is such that the reference resource is in the same valid downlink slot as the corresponding CSI request, otherwise $n_{CSI\_ref}$ is the smallest value greater than or equal to floor $(Z'/N^{slot}_{symb})$, such that slot $n-n_{CSI\_ref}$ corresponds to a valid downlink slot, where Z' corresponds to the delay requirement (See Table 7 or Table 8).

when periodic or semi-persistent CSI-RS/CSI-IM or SSB is used for channel/interference measurements, the UE is not expected to measure channel/interference on the CSI-RS/CSI-IM/SSB whose last OFDM symbol is received up to Z' symbols before transmission time of the first OFDM symbol of the aperiodic CSI reporting.

Table 7 shows CSI computation delay requirement 1, and Table 8 shows CSI computation delay requirement 2. For example, according to 3GPP TS 38.214 Rel-16, Z, Z' and u are defined as $Z=\max_{m=0, \ldots, M-1}(Z(m)$ and $Z'=\max_{m=0, \ldots, M-1}(Z'(m)$, where M is the number of updated CSI report(s), (Z(m), Z'(m)) corresponds to the m-th updated CSI report and is defined as $(Z_1,Z_1')$ of Table 7, $(Z_1,Z_1')$ of Table 8, $(Z_3,Z_3')$ of Table 8, or $(Z_2,Z_2')$ of Table 8 according to the predefined conditions.

TABLE 7

| | $Z_1$ [symbols] | |
|---|---|---|
| u | $Z_1$ | $Z'_1$ |
| 0 | 10 | 8 |
| 1 | 13 | 11 |
| 2 | 25 | 21 |
| 3 | 43 | 36 |

TABLE 8

| | $Z_1$ [symbols] | | $Z_2$ [symbols] | | $Z_3$ [symbols] | |
|---|---|---|---|---|---|---|
| u | $Z_1$ | $Z'_1$ | $Z_2$ | $Z'_2$ | $Z_3$ | $Z'_3$ |
| 0 | 22 | 16 | 40 | 37 | 22 | $X_0$ |
| 1 | 33 | 30 | 72 | 69 | 33 | $X_1$ |
| 2 | 44 | 42 | 141 | 140 | $\min(44, X_2 + KB_1)$ | $X_2$ |
| 3 | 97 | 85 | 152 | 140 | $\min(97, X_3 + KB_2)$ | $X_3$ |

u of Table 7 and Table 8 corresponds to the min ($u_{PDCCH}$, $u_{CSI\text{-}RS}$, $u_{UL}$) where the $u_{PDCCH}$ corresponds to the subcarrier spacing of the PDCCH with which the DCI was transmitted and $u_{UL}$ corresponds to the subcarrier spacing of the PUSCH with which the CSI report is to be transmitted and $u_{CSI\text{-}RS}$ corresponds to the minimum subcarrier spacing of the aperiodic CSI-RS triggered by the DCI. In Table 8, $X_u$ is according to UE reported capability beamReportTiming, $KB_1$ is according to UE reported capability beamSwitch Timing (see 3GPP TS 38.306).

A slot in a serving cell may be considered to be a valid downlink slot if it comprises at least one higher layer configured downlink or flexible symbol, and it does not fall within a configured measurement gap for that UE. If there is no valid downlink slot for the CSI reference resource corresponding to a CSI Report Setting in a serving cell, CSI reporting is omitted for the serving cell in uplink slot n'.

After the CSI report (re) configuration, serving cell activation, BWP change, or activation of SP-CSI, the UE reports a CSI report only after receiving at least one CSI-RS transmission occasion for channel measurement and CSI-RS and/or CSI-IM occasion for interference measurement no later than CSI reference resource and drops the report otherwise.

The UE, for example, derives for each CQI value reported in uplink slot n the highest CQI index which satisfies the following condition: a single PDSCH transport block with a combination of modulation scheme, target code rate and transport block size corresponding to the CQI index, and occupying a group of downlink physical resource blocks termed the CSI reference resource, could be received with a transport block error probability not exceeding. According to the higher layer parameter values provided by BS: the UE derives the channel measurements for computing CSI value reported in uplink slot n based on only the NZP CSI-RS, no later than the CSI reference resource, associated with the CSI resource setting; the UE derives the channel measurements for computing CSI reported in uplink slot n based on only the most recent, no later than the CSI reference resource, occasion of NZP CSI-RS associated with the CSI resource setting; the UE derives the interference measurements for computing CSI value reported in uplink slot n based on only the CSI-IM and/or NZP CSI-RS for interference measurement no later than the CSI reference resource associated with the CSI resource setting; or the UE derives the interference measurements for computing the CSI value reported in uplink slot n based on the most recent, no later than the CSI reference resource, occasion of CSI-IM and/or NZP CSI-RS for interference measurement (defined in [4, TS 38.211]) associated with the CSI resource setting.

In some implementations, if configured to report CQI index, in the CSI reference resource, the UE assumes some conditions for the purpose of deriving the CQI index, and if also configured, for deriving PMI and RI. For example, the UE assumes the following: the first 2 OFDM symbols are occupied by control signaling; the number of PDSCH and DM-RS symbols is equal to 12; the same bandwidth part subcarrier spacing configured as for the PDSCH reception; the bandwidth as configured for the corresponding CQI report, the reference resource uses the CP length and subcarrier spacing configured for PDSCH reception; no resource elements used by primary or secondary synchronization signals or PBCH, redundancy version 0 and the like.

In some scenarios, CSI reporting is triggered by RRC and/or DCI, and the CSI reporting is related to a CSI reporting configuration. The CSI reporting configuration indicate PUCCH resource(s) and a CSI-RS resource configuration to be used for the CSI reporting, and the UE determines a CSI reference resource to be used for the triggered CSI reporting. The above process may be considered as a basic process of finding the closest CSI-RS/CSI-IM/SSB that satisfies a required processing time for CSI reporting, which is denoted as Z or Z'. In some implementations of the present disclosure, when the UE considers a CSI reference resource to determine whether to perform partial CSI reporting, a shorter CSI processing time may be assumed. For example, a required CSI processing time for partial CSI reporting, denoted as $Z_{pCSI}$, may be considered. In this case, $Z_{pCSI}$, which is smaller than Z or Z', may be predefined, determined by capability signaling of the UE, or determined by higher layer signaling or L1 signaling from the BS. In some implementations of the present disclosure, if a CSI reference resource satisfies $Z_{pCSI}$ (where $Z_{pCSI}<Z$ and $Z_{pCSI}<Z'$), the UE performs partial CSI reporting based on the CSI reference resource. If the CSI reference resource satisfies not only Z but also Z or Z', the UE may perform conventional full CSI reporting based on the CSI reference resource.

For $Z_{pCSI}$, the following methods may be considered to select the CSI reference resource.

For periodic and semi-persistent CSI reporting

In some implementations of the present disclosure, considering the number of slots, which is denoted as $n_{CSI\_ref}$, used in a process of determining a CSI reference resource defined in Section 5.2.2.5 of 3GPP TS 38.214, $n_{CSI\_ref}$ is the smallest value greater than or equal to $X*2\hat{\ }u_{DL}$ such that the resource corresponds to a valid DL symbol. In some implementations, X may be an integer smaller than 5, such as 1, 2, or 3. In some implementations, X may be greater than floor ($Z_{pCSI}/N^{slot}_{symb}$).

Alternatively, in some implementations of the present disclosure, considering the number of slots denoted as $n_{CSI\_ref}$ used in the process of determining a CSI reference resource defined in Section 5.2.2.5 of 3GPP TS 38.214, $n_{CSI\_ref}$ is the smallest value greater than or equal to floor ($Z_{pCSI}/N^{slot}_{symb}$) such that the resource corresponds to a valid DL symbol.

For aperiodic CSI reporting for a CSI request in slot n'

In some implementations of the present disclosure, considering the number of slots denoted as $n_{CSI\_ref}$ used in the process of determining a CSI reference resource defined in Section 5.2.2.5 of 3GPP TS 38.214, if the UE is instructed by DCI to report CSI in the same slot as the slot in which the CSI request is received, $n_{CSI\_ref}$ is to ensure that the reference resource is in the same valid DL slot as the corresponding CSI request. Otherwise, $n_{CSI\_ref}$ is the smallest value greater than or equal to floor ($Z_{pCSI}/N^{slot}_{symb}$) such that slot (n-nest ret) is a valid DL slot. In this case, DL slot n is defined by UL slot n' as described in Section 5.2.2.5 of 3GPP TS 38.214.

If periodic or semi-persistent CSI-RS/CSI-IM or SSB is used for channel/interference measurements, the UE is not expected to measure a channel/interference on the CSI-RS/CSI-IM/SSB where the last OFDM symbol is received up to $Z_{pCSI}$ symbols before the transmission time of the first OFDM symbol of the aperiodic CSI reporting.

According to some implementations of the present disclosure, when the UE transmits CSI, the UE may selectively include a CQI, RI, and PMI in a CSI report as part of the total CSI that the UE is configured and/or instructed to report.

The following UE operation(s) may be further considered in some implementations of the present disclosure.

<Implementation A1> Conditional Partial CSI Reporting

When the UE is capable of performing partial CSI reporting and the UE is configured with a CSI configuration that allows the partial CSI reporting, the UE may perform the partial CSI reporting only under predetermined condition(s). For example, at least one of the following conditions may be considered:

L1 signaling (e.g., DCI) that triggers the corresponding CSI configuration includes an indicator indicating the partial CSI reporting.

RI and/or PMI values in previously reported CSI values remains within a certain threshold range T for K consecutive times (in other words, for any two values selected among the previously reported K values, the difference between the two values is within T). In this case, each of K and T may have a predefined value or a value configured or indicated by higher layer parameters or L1 signaling from the BS. The previously reported CSI values may be values associated with a specific CSI configuration. For example, the specific CSI configuration may be a CSI configuration for the partial CSI reporting or a CSI configuration related thereto.

Figure 9:
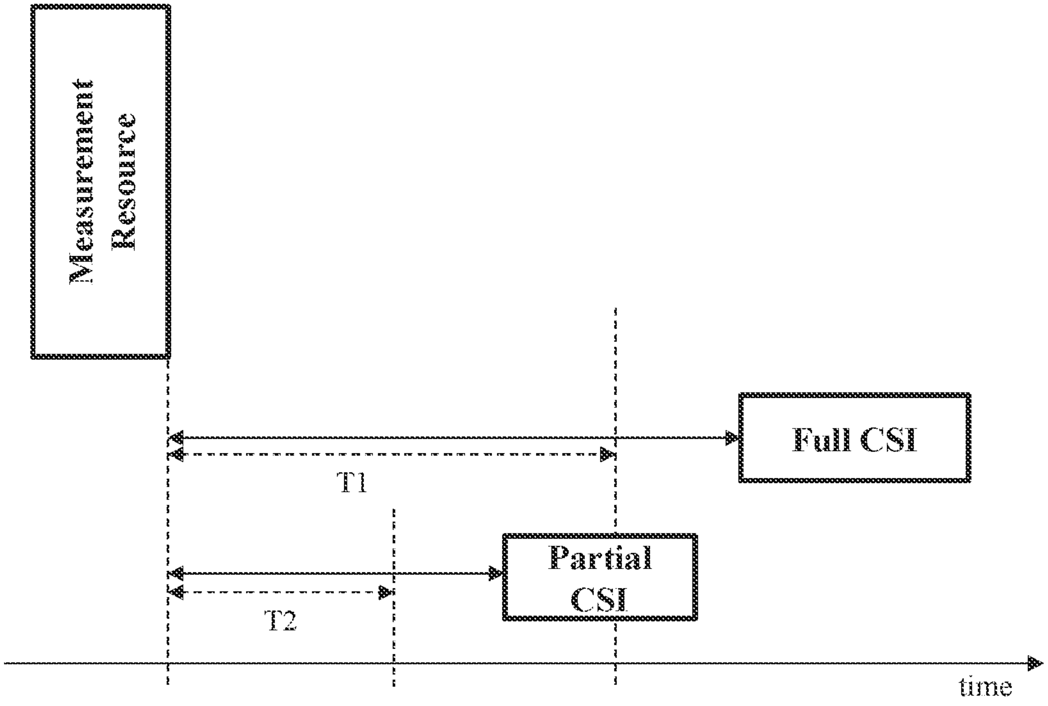
FIG. 9 illustrates an example of partial channel state information (CSI) reporting according to some implementations of the present disclosure.

FIG. 9 illustrates an example of partial CSI reporting according to some implementations of the present disclosure. The partial CSI reporting may be performed based on the time interval between a PUSCH/PUCCH resource on which CSI is to be reported and a measurement resource to be used for CSI reporting. For example, referring to FIG. 9, when the time interval from the end of the last symbol of the measurement resource to be used to the start of the first symbol of the PUSCH/PUCCH resource on which the CSI is to be reported is smaller than a prescribed time interval T1 and greater than or equal to a prescribed time interval T2, the partial CSI reporting may be performed, where T1>T2.

The time interval T1 may represent a conventional required CSI processing time. For example, the time interval T1 may be a predefined processing time to ensure the time required to calculate an entire set of CSI values configured to be included in triggered CSI report(s). For example, the time interval T1 may refer to a symbol length L or Z' or a CSI computation time $T_{proc,CSI}$ of $T'_{proc,CSI}$ obtained from the symbol length L or Z', which are defined in Section 5.4 of 3GPP TS 38.214. For example, referring to section 5.4 of 3GPP TS 38.214 Rel-16, when the CSI request field on a DCI triggers a CSI report(s) on PUSCH, the UE shall provide a valid CSI report for the n-th triggered report, if the first uplink symbol to carry the corresponding CSI report(s) including the effect of the timing advance, starts no earlier than at symbol $Z_{ref}$ and if the first uplink symbol to carry the n-th CSI report including the effect of the timing advance, starts no earlier than at symbol DCI $Z'_{ref}(n)$, where $Z_{ref}$ is defined as the next uplink symbol with its CP starting $T_{proc,CSI}=(Z)*(2048+144)*\kappa*2^{-u}*T_c+T_{switch}$ after the end of the last symbol of the PDCCH triggering the CSI report(s), and where $Z'_{ref}(n)$ is defined as the next uplink symbol with its CP starting $T'_{proc,CSI}=(Z')*(2048+144)*\kappa*2^{-u}*T_c$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report, and where $T_{switch}$ is applied only when Z, in Table 7 is applied. As described above, Z, Z', and u may be defined as follows: $Z=\max_{m=0, \ldots, M-1}(Z(m)$ and $Z'=\max_{m=0, \ldots, M-1}(Z'(m)$. Here, M denotes the number of updated CSI report(s), and (Z(m), Z'(m)) corresponds to an m-th updated CSI report and is defined as ($Z_1$,$Z_1$') in Table 7, ($Z_1$,$Z_1$') in Table 8, ($Z_3$,$Z_3$') in Table 8, or ($Z_2$,$Z_2$') in Table 8, depending on predetermined conditions.

The time interval T2 may represent a required CSI processing time for partial CSI reporting in terms of measurement resources. T2 may be a predefined value, a value determined by capability signaling of the UE, or a value determined by higher layer signaling or L1 signaling from the BS.

Figure 10:
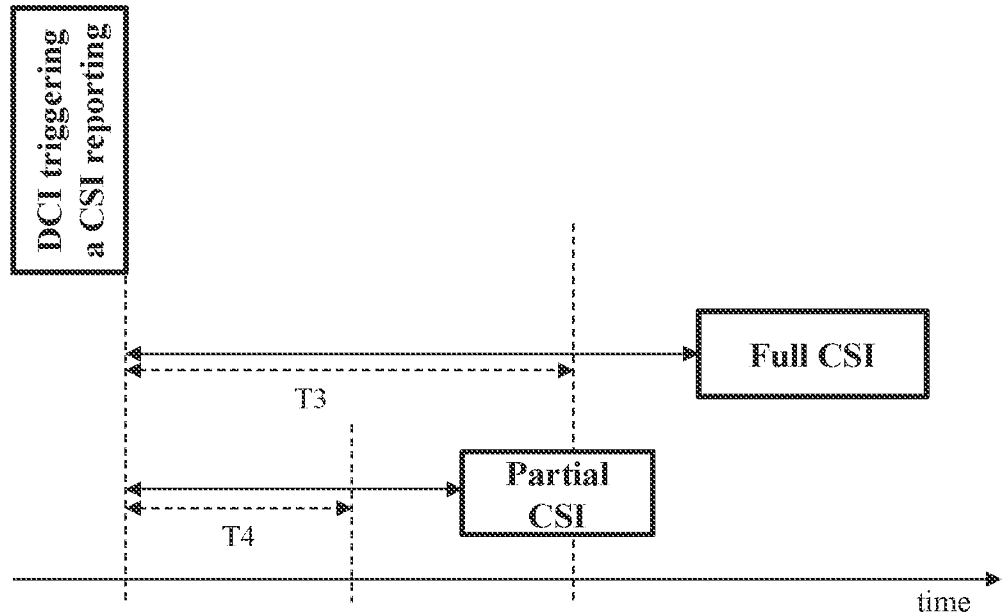
FIG. 10 illustrates another example of partial CSI reporting according to some implementations of the present disclosure.

FIG. 10 illustrates another example of partial CSI reporting according to some implementations of the present disclosure. The UE may perform the partial CSI reporting based on the time interval between a PUSCH/PUCCH resource on which CSI is to be reported and reception of DCI that triggers a CSI report. For example, referring to FIG. 10, when the time interval from the end of the last symbol of a PDCCH on which the DCI that triggers the CSI report is received to the start of the first symbol of the PUSCH/PUCCH resource on which the CSI is to be reported is smaller than a prescribed time interval T2 and greater than or equal to a prescribed time interval T4, the partial CSI reporting may be performed, where T3>T4.

The time interval T3 may represent a conventional required CSI processing time. For example, the time interval T3 may be a predefined processing time to ensure the time required to calculate an entire set of CSI values configured to be included in triggered CSI report(s). For example, the time interval T3 may refer to the CSI computation time (e.g., $T_{proc,CSI}$ or $T'_{proc,CSI}$) defined in Section 5.4 of 3GPP TS 38.214.

The time interval T4 may represent a required CSI processing time for partial CSI reporting in terms of DCI reception. T4 may be a predefined value, a value determined by capability signaling of the UE, or a value determined by higher layer signaling or L1 signaling from the BS.

In cases where the conditions are not met: for example, referring to FIG. 9, when the time interval from the end of the last symbol of the measurement resource to be used to the start of the first symbol of the PUSCH/PUCCH resource on which the CSI is to be reported is greater than or equal to the prescribed time interval T1; or for example, referring to FIG. 10, when the time interval from the end of the last symbol of the PDCCH on which the DCI that triggers the CSI report is received to the start of the first symbol of the PUSCH/PUCCH resource on which the CSI is to be reported is greater than or equal to the prescribed time interval T3, the UE may perform the conventional CSI reporting including all information based on the CSI configuration that allows the partial CSI reporting.

In other cases where the conditions are not met: for example, referring to FIG. 9, when the time interval from the end of the last symbol of the measurement resource to be used to the start of the first symbol of the PUSCH/PUCCH resource on which the CSI is to be reported is smaller than the prescribed time interval T2, the UE may perform the conventional CSI reporting including all information based on the CSI configuration that allows the partial CSI reporting. To this end, the UE may determine a measurement resource whose time interval from the end of the last symbol of the measurement resource to be used to the start of the first symbol of the PUSCH/PUCCH resource on which the CSI is to be reported is greater than the prescribed time interval T1 as a new measurement resource for the corresponding CSI reporting.

<Implementation A1-1> CSI Indicator for Partial CSI Reporting

When the UE transmits partial CSI by performing partial CSI reporting depending on predetermined conditions as described in Implementation A1/B1, the UE may arbitrarily perform the partial CSI reporting or full CSI reporting depending on the situation. That is, when the UE performs the partial CSI reporting depending on the predetermined conditions and when whether the conditions are satisfied is determined based on information derived by the UE, the BS may not predict whether the UE will perform the partial CSI reporting or full CSI reporting. In addition, when the BS does not know the total bit size of UL transmission performed by the UE, it may be difficult for the BS to decode the corresponding UL transmission. Accordingly, the UE may need to indicate to the BS whether the UL transmission is the partial CSI reporting or full CSI reporting. To indicate whether the partial CSI reporting is performed, at least one of the following methods may be used.

The UE may encode a predefined length of bit information that represents the total bit length of a CSI report separately from the CSI report and then append the predefined length of bit information to the CSI report.

The UE may separately encode 1-bit information indicating whether the partial CSI reporting is performed and then append the 1-bit information to the CSI report.

The UE may use different CRC masking for the partial CSI reporting and full CSI reporting. In this case, values configured to the UE through each CSI configuration may be used as information for the CRC masking.

The UE may use different scrambling sequences for the partial CSI reporting and full CSI reporting. In this case, values configured to the UE through each CSI configuration may be used as information for deriving the scrambling sequences.

The UE may use different PUCCH resources for the partial CSI reporting and full CSI reporting. To this end, PUCCH resources to be used for the partial CSI reporting may be additionally configured in CSI configurations provided to the UE.

The UE may perform reporting by including the partial CSI reporting in Part 2 of Type I and Type II CSI of the prior art. According to 3GPP TS 38.214, for CSI feedback over a PUSCH such as Type I CSI, Type II CSI, and enhanced Type II CSI, a CSI report consists of two parts. Part I has a fixed payload size and is used to identify the number of information bits in Part 2. The entirety of Part 1 is transmitted before Part 2. In other words, the UE may include the partial CSI reporting in Part 2 and indicate through Part 1 whether partial CSI is included. Accordingly, the BS may estimate the bit length of Part 2 by receiving and decoding Part 1 of the fixed bit length and successfully receive the partial CSI reporting. For the above operation, information indicating whether the partial CSI reporting is performed may be included in Part 1 of CSI.

The UE may perform CSI reporting by adding as additional Part 3 the partial CSI reporting to conventional Type I and Type II CSI. According to 3GPP TS 38.214, for CSI feedback over a PUSCH such as Type I CSI, Type II CSI, and enhanced Type II CSI, a CSI report consists of two parts. Part I has a fixed payload size and is used to identify the number of information bits in Part 2. The entirety of Part 1 is transmitted before Part 2. If the UE includes the partial CSI reporting in new Part 3 and indicates through Part I whether partial CSI is included, the UE may inform whether the partial CSI reporting is included not only without any changes in existing Part 2 CSI but also without ambiguity in the bit size. Accordingly, the BS may estimate the bit length of Part 2 by receiving and decoding Part I of the fixed bit length and successfully receive the partial CSI reporting. For the above operation, information indicating whether the partial CSI reporting is performed may be included in Part 1 of CSI. The corresponding information may be encoded separately from the other values in CSI Part 1. In addition, CSI part 3, which is newly added in the above operation, may be encoded separately from other CSI parts.

The UE may include part of partial CSI in Part 1 of conventional Type I and II CSI and include the rest of the partial CSI in Part 2 thereof. In this case, the partial CSI included in Part 1 may be always transmitted whenever the corresponding CSI report is transmitted, regardless of whether predetermined conditions are met. Alternatively, the partial CSI included in Part 1 may always be zero-padded as much as the size of bits to be transmitted and then transmitted. The partial CSI included in Part 2 may be transmitted depending on whether the predetermined conditions are met. In this case, the CSI included in Part 1 may be composed of information on specific subband(s), such as subband(s) with even or odd indices. Accordingly, even if the BS fails to receive the Part 2 CSI due to ambiguity, the BS may receive the CSI on all radio resources through Part 1.

<Implementation A2> Hierarchical CSI Configuration for Partial CSI Reporting

The UE may receive two or more CSI configurations from the BS to perform partial CSI reporting. In this case, among the CSI configurations, one or more CSI configuration(s) X may be for the partial CSI reporting, and one or more other CSI configuration(s) Y may be for general CSI reporting. Each CSI configuration configured for the partial CSI reporting may be associated with the one or more CSI configuration(s) Y. For example, CSI configuration(s) X may be configured to have the one or more CSI configuration(s) Y as reference CSI configuration(s). Alternatively, for one CSI configuration Y, a parent-child relationship may be established with Y as the parent and X as the child.

When at least one of the condition(s) illustrated in Implementation A1/B1 is satisfied for CSI configuration(s) Y, the UE may consider that the partial CSI reporting is triggered for CSI configuration(s) X associated with CSI configuration(s) Y. Accordingly, the UE may perform the partial CSI reporting. For example, the partial CSI reporting may be triggered based on another CSI configuration associated with partial CSI configuration(s) X. Accordingly, the partial CSI reporting may be performed. Such triggering may be performed based on CSI reported through the other CSI configuration.

<Implementation A3> PUCCH Resource Selection for Partial CSI Reporting

In systems based on some scenarios (e.g., NR Rel-16 based systems), the UE may determine PUCCH to transmit based on the size of all UCI bits for PUCCH transmission to be included in the PUCCH and a set of PUCCH resources indicated or configured for the corresponding PUCCH transmission. If multiple PUCCH transmissions overlap in time, the PUCCH to be used may be determined based on to the size of all UCI bits to be transmitted in the overlapping PUCCHs and the type of UCI (e.g., SR, HARQ-ACK, CSI, etc.).

The BS needs to know the exact size of all UCI bits transmitted by the UE to predict the PUCCH transmission from the UE. However, when some implementations of the present disclosure are applied or when the UE autonomously performs the partial CSI reporting, the total UCI bit size may vary depending on whether the partial CSI reporting is performed. This may result in ambiguity between the UE and BS. To address the issue, at least one of the following methods may be used to ensure that the UE and BS determine the same PUCCH resources.

- The UE and BS may assume a specific value for the UCI size of the partial CSI reporting when selecting PUCCH resources. The specific value may be determined regardless of whether the partial CSI reporting is actually performed.
  - The specific value may be a predefined value, a value configured by higher layer signaling from the BS, or a value indicated by L1 signaling. For example, the specific value may be a value determined based on parameter(s) in a CSI configuration associated with the partial CSI reporting or correspond to the maximum length of CSI bits capable of being transmitted based on the corresponding CSI configuration.
  - If the specific value is smaller than the actual bit length of CSI required for transmission, the UE may omit part of the CSI such that the CSI bit length becomes smaller than or equal to the specific value. To implement this operation, the specific value may be set to an upper limit of the CSI bit length capable of being included during the UCI multiplexing process. Such a process may be performed for each constituent part of the CSI, and in this case, the specific value may be an upper limit of the bit size of a part that includes the partial CSI reporting.
- If the partial CSI reporting is transmitted only when predetermined conditions are satisfied, the UE and BS may assume that the partial CSI reporting is always transmitted on configured resources and then select PUCCH resources for CSI reporting.

<Implementation A4> Extended CQI Bit Range

When the UE reports CQI information as part of CSI, a larger bit size may be allocated for CQI reporting to enhance the accuracy of the CQI information. In particular, when the UE reports a CQI value per subband, it may be considered to use a 3-bit differential CQI table or a 4-bit CQI table, instead of using a 2-bit differential CQI table. For partial CQI reporting, this operation may be beneficial because the CQI information is extended and transmitted instead of an RI/PMI. Further, even when the partial CQI reporting is not performed, the operation may improve the accuracy of the CQI information. For example, the 3-bit differential CQI table illustrated in Table 9 may be employed. Alternatively, one of the 4-bit CQI tables shown in Tables 10 to 13 may be used.

TABLE 9

| Subband differential CQI value | Offset level |
|---|---|
| 0 | 0 |
| 1 | 1 |
| 2 | 2 |
| 3 | 3 |
| 4 | ≥4 |
| 5 | −1 |
| 6 | −2 |
| 7 | ≤−3 |

TABLE 10

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2,4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 11

| CQI index | modulation | code rate × 1024 | efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 12

| CQI index | modulation | code rate × 1024 | efficiency |
|---|---|---|---|
| 0 | out of range | | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

TABLE 13

| CQI index | modulation | code rate × 1024 | efficiency |
|---|---|---|---|
| 0 | out of range | | |
| 1 | QPSK | 78 | 0.1523 |
| 2 | QPSK | 193 | 0.377 |
| 3 | QPSK | 449 | 0.877 |
| 4 | 16QAM | 378 | 1.4766 |
| 5 | 16QAM | 616 | 2.4063 |
| 6 | 64QAM | 567 | 3.3223 |
| 7 | 640AM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 853 | 8.3301 |
| 15 | 1024QAM | 948 | 9.2578 |

A higher layer parameter cqi-Table in CSI-ReportConfig provided by the BS configures table1 corresponding to Table 10, table2 corresponding to Table 11, table3 corresponding to Table 12, or table4 corresponding to Table 13.

However, if the 3-bit differential CQI table or the 4-bit CQI table is used for all subbands at all times, CSI overhead may increase. To address this issue, at least one of the following methods may be considered.

Method 1: The most significant bits (MSBs) of a bit sequence in which Part 1 CSI or a subband CQI is included may contain a bit length used for the entirety or part of the subband CQI. The UE may extend per-subband CQI to the bit length to be used by the CQI and report the subband CQI as Part 2 CSI. The UE is allowed to transmit the extended CQI information only when the UE needs to transmit the extended CQI information. For example, the UE may report the CSI by including one bit (e.g., '0'=legacy and 'I'=extended to three bits) indicating the bit length to be used for the subband CQI in the Part 1 CSI and including the subband CQI to which the extended CQI bit range is applied in the Part 2 CSI. Upon receiving the CSI, the BS may interpret the subband CQI to be reported in the Part 2 CSI.

Additionally, in some implementations of the present disclosure, subband CSI reporting to which the extended CQI bit range is applied may be assigned a higher priority compared to other CSI reporting. For example, the values of y or k may be determined depending on whether the extended CQI bit range is applied when the priorities of CSI reports are determined as follows: the CSI reports are associated with a priority value of $Pri_{iCSI}(y,k,c,s)=2*N_{cells}*M_s*y+N_{cells}*M_s*k+M_s*c+s$, where:

y=0 for aperiodic CSI reports to be carried on the PUSCH, y=1 for semi-persistent CSI reports to be carried on the PUSCH, y=2 for semi-persistent CSI reports to be carried on the PUCCH, and y=3 for periodic CSI reports to be carried on the PUCCH;

k=0 for CSI reports carrying L1-RSRP or L1-SINR and k=1 for CSI reports not carrying L1-RSRP or L1-SINR;

c is the index of a serving cell, and $N_{cells}$ is the value of a higher layer parameter maxNrofServingCells provided by the BS; and s is reportConfigID, and $M_s$ is the value of a higher layer parameter maxNrofCSI-ReportConfigurations provided by the BS.

If the associated value of $Pri_{iCSI}(y,k,c,s)$ is lower for a first CSI report than for a second CSI report, the first CSI report may be said to have priority over the second CSI report.

As an example, when the extended CQI bit range is applied, k may be determined as follows: k=0 or k=−1.

As another example, when the extended CQI bit range is applied, a value obtained by subtracting 0.5 or 1 from the determined value of k may be used. If the value of k is smaller than 0 due to the above operation, k=0 may be used.

As a further example, when the extended CQI bit range is applied, a value obtained by subtracting 0.5 or 1 from the determined value of y may be used. If the value of y is smaller than 0 due to the above operation, y=0 may be used.

Figure 11:
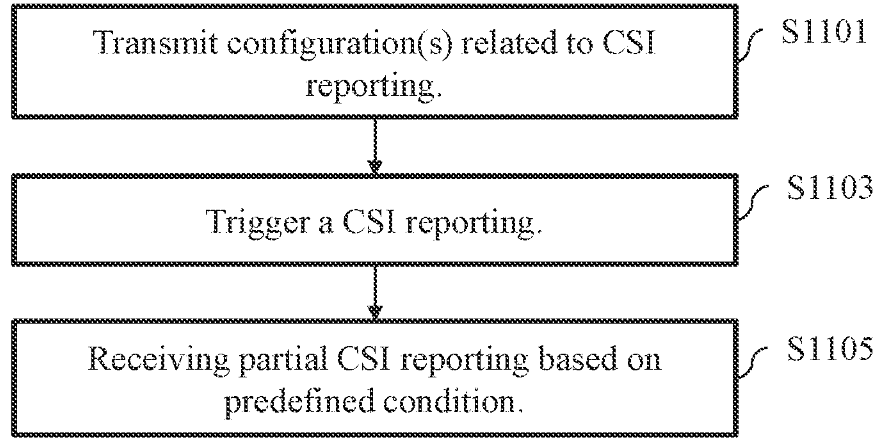
FIG. 11 illustrates an operational flow of a base station (BS) according to some implementations of the present disclosure.

BS Side:

The above-described implementations of the present disclosure will be explained again from the perspective of the BS. FIG. 11 illustrates an operational flow of the BS according to some implementations of the present disclosure.

The BS may configure higher layer parameter(s) required for CSI transmission to the UE. Only when condition(s) according to some implementations of the present disclosure are satisfied, the BS may expect partial CSI reporting by the UE and receive and decode a CSI report from the UE. Alternatively, the BS may recognize whether the UE performs the partial CSI reporting or full CSI reporting by performing blind decoding of the partial CSI reporting or based on an indicator included in CSI transmission. Then, the BS may receive and decode the CSI report from the UE. In some implementations of the present disclosure, the following BS operation(s) may be considered.

The BS may transmit one or more RRC configurations for CSI reception to the UE (S1101) The RRC configurations may be transmitted separately for each CSI configuration(s).

The BS may trigger CSI reporting to the UE (S1103). The BS may receive the triggered CSI report on a PUCCH resource or a PUSCH resource.

Upon receiving the CSI, the BS may assume that the UE will optionally update CQI, RI, and PMI information according to some implementations of the present disclosure. In other words, the BS may receive a partial CSI report based on partial CSI reporting from the UE according to some implementations of the present disclosure (S1105). For example, to determine whether the UE performs the partial CSI reporting, the BS may assume that the UE will consider the time-domain location of the last measurement resource to be used for the CSI reporting.

The following BS operation(s) may be further considered in some implementations of the present disclosure.

<Implementation B1> Conditional Partial CSI Reporting

When the UE is capable of performing partial CSI reporting and the UE is configured with a CSI configuration that allows the partial CSI reporting, the BS may assume that the UE will perform the partial CSI reporting only under predetermined condition(s). For example, at least one of the following conditions may be considered:

- L1 signaling (e.g., DCI) that triggers the corresponding CSI configuration includes an indicator indicating the partial CSI reporting.
- RI and/or PMI values in previously reported CSI values remains within a certain threshold range T for K consecutive times (in other words, for any two values selected among the previously reported K values, the difference between the two values is within T). In this case, each of K and T may have a predefined value or a value configured or indicated by higher layer parameters or L1 signaling from the BS. The previously reported CSI values may be values associated with a specific CSI configuration. For example, the specific CSI configuration may be a CSI configuration for the partial CSI reporting or a CSI configuration related thereto.
- The partial CSI reporting may be performed based on the time interval between a PUSCH/PUCCH resource on which CSI is to be reported and a measurement resource to be used for CSI reporting. For example, referring to FIG. 9, when the time interval from the end of the last symbol of the measurement resource to be used to the start of the first symbol of the PUSCH/PUCCH resource on which the CSI is to be reported is smaller than a prescribed time interval T1 and greater than or equal to a prescribed time interval T2, the partial CSI reporting may be performed, where T1>T2.
  - The time interval T1 may represent a conventional required CSI processing time. For example, the time interval T1 may be a predefined processing time to ensure the time required to calculate an entire set of CSI values configured to be included in triggered CSI report(s). For example, the time interval T1 may refer to a symbol length L or Z' or a CSI computation time $T_{proc,CSI}$ Or $T'_{proc,CSI}$ obtained from the symbol length L or Z', which are defined in Section 5.4 of 3GPP TS 38.214. For example, referring to section 5.4 of 3GPP TS 38.214 Rel-16, when the CSI request field on a DCI triggers a CSI report(s) on PUSCH, the UE shall provide a valid CSI report for the n-th triggered report, if the first uplink symbol to carry the corresponding CSI report(s) including the effect of the timing advance, starts no earlier than at symbol $Z_{ref}$ and if the first uplink symbol to carry the n-th CSI report including the effect of the timing advance, starts no earlier than at symbol DCI $Z'_{ref}(n)$, where $Z_{ref}$ is defined as the next uplink symbol with its CP starting $I_{proc,CSI}=(Z)*(2048+144)*\kappa*2^{-u}*T_c+T_{switch}$ after the end of the last symbol of the PDCCH triggering the CSI report(s), and where $Z'_{ref}(n)$ is defined as the next uplink symbol with its CP starting $T'_{proc,CSI}=(Z')*(2048+144)*\kappa*2^{-u}T_c$ after the end of the last symbol in time of the latest of: aperiodic CSI-RS resource for channel measurements, aperiodic CSI-IM used for interference measurements, and aperiodic NZP CSI-RS for interference measurement, when aperiodic CSI-RS is used for channel measurement for the n-th triggered CSI report, and where $T_{switch}$ is applied only when $Z_1$ in Table 7 is applied. As described above, Z, Z', and u may be defined as follows: $Z=\max_{m=0, \ldots, M-1}(Z(m))$ and $Z'=\max_{m=0, \ldots, M-1}(Z'(m))$. Here, M denotes the number of updated CSI report(s), and (Z(m), Z'(m)) corresponds to an m-th updated CSI report and is defined as $(Z_1,Z_1')$ in Table 7, $(Z_1,Z_1')$ in Table 8, $(Z_3,Z_3')$ in Table 8, or $(Z_2,Z_2')$ in Table 8, depending on predetermined conditions.
  - The time interval T2 may represent a required CSI processing time for partial CSI reporting in terms of measurement resources. T2 may be a predefined value, a value determined by capability signaling of the UE, or a value determined by higher layer signaling or L1 signaling from the BS.
- The UE may perform the partial CSI reporting based on the time interval between a PUSCH/PUCCH resource on which CSI is to be reported and reception of DCI that triggers a CSI report. For example, referring to FIG. 10, when the time interval from the end of the last symbol of a PDCCH on which the DCI that triggers the CSI report is received to the start of the first symbol of the PUSCH/PUCCH resource on which the CSI is to be reported is smaller than a prescribed time interval T2 and greater than or equal to a prescribed time interval T4, the partial CSI reporting may be performed, where T3>T4.
  - The time interval T3 may represent a conventional required CSI processing time. For example, the time interval T3 may be a predefined processing time to ensure the time required to calculate an entire set of CSI values configured to be included in triggered CSI report(s). For example, the time interval T3 may refer to the CSI computation time (e.g., $T_{proc,CSI}$ or $T'_{proc,CSI}$) defined in Section 5.4 of 3GPP TS 38.214.
  - The time interval T4 may represent a required CSI processing time for partial CSI reporting in terms of DCI reception. T4 may be a predefined value, a value determined by capability signaling of the UE, or a value determined by higher layer signaling or L1 signaling from the BS.

In cases where the conditions are not met: for example, referring to FIG. 9, when the time interval from the end of the last symbol of the measurement resource to be used to the start of the first symbol of the PUSCH/PUCCH resource on which the CSI is to be reported is greater than or equal to the prescribed time interval T1; or for example, referring to FIG. 10, when the time interval from the end of the last symbol of the PDCCH on which the DCI that triggers the CSI report is received to the start of the first symbol of the PUSCH/PUCCH resource on which the CSI is to be reported is greater than or equal to the prescribed time interval T3, the BS may assume that the UE will perform the conventional CSI reporting including all information based on the CSI configuration that allows the partial CSI reporting.

In other cases where the conditions are not met: for example, referring to FIG. 9, when the time interval from the end of the last symbol of the measurement resource to be used to the start of the first symbol of the PUSCH/PUCCH resource on which the CSI is to be reported is smaller than the prescribed time interval T2, the BS may assume that the UE will perform the conventional CSI reporting including all information based on the CSI configuration that allows the partial CSI reporting. To this end, the BS may assume that the UE will determine a measurement resource whose time interval from the end of the last symbol of the measurement resource to be used to the start of the first symbol of the PUSCH/PUCCH resource on which the CSI is to be reported is greater than the prescribed time interval T1 as a new measurement resource for the corresponding CSI reporting.

<Implementation B1-1> CSI Indicator for Partial CSI Reporting

When the UE transmits partial CSI by performing partial CSI reporting depending on predetermined conditions as described in Implementation A1/B1, the UE may arbitrarily perform the partial CSI reporting or full CSI reporting depending on the situation. That is, when the UE performs the partial CSI reporting depending on the predetermined conditions and when whether the conditions are satisfied is determined based on information derived by the UE, the BS may not predict whether the UE will perform the partial CSI reporting or full CSI reporting. In addition, when the BS does not know the total bit size of UL transmission performed by the UE, it may be difficult for the BS to decode the corresponding UL transmission. Accordingly, the UE may need to indicate to the BS whether the UL transmission is the partial CSI reporting or full CSI reporting. To indicate whether the partial CSI reporting is performed, at least one of the following methods may be used. In addition, the BS may receive a CSI report from the UE by assuming the following methods.

- The BS may assume that the UE will encode a predefined length of bit information that represents the total bit length of the CSI report separately from the CSI report and then append the predefined length of bit information to the CSI report.
- The BS may assume that the UE will separately encode 1-bit information indicating whether the partial CSI reporting is performed and then append the 1-bit information to the CSI report.
- The BS may assume that the UE will use different CRC masking for the partial CSI reporting and full CSI reporting. In this case, values configured to the UE through each CSI configuration may be used as information for the CRC masking.
- The BS may assume that the UE will use different scrambling sequences for the partial CSI reporting and full CSI reporting. In this case, values configured to the UE through each CSI configuration may be used as information for deriving the scrambling sequences.
- The BS may assume that the UE will use different PUCCH resources for the partial CSI reporting and full CSI reporting. To this end, PUCCH resources to be used for the partial CSI reporting may be additionally configured in CSI configurations provided to the UE.
- The BS may assume that the UE will perform reporting by including the partial CSI reporting in Part 2 of Type I and Type II CSI of the prior art. According to 3GPP TS 38.214, for CSI feedback over a PUSCH such as Type I CSI, Type II CSI, and enhanced Type II CSI, a CSI report consists of two parts. Part I has a fixed payload size and is used to identify the number of information bits in Part 2. The entirety of Part I is transmitted before Part 2. In other words, the BS may assume that the UE will include the partial CSI reporting in Part 2 and indicate through Part 1 whether partial CSI is included. Accordingly, the BS may estimate the bit length of Part 2 by receiving and decoding Part 1 of the fixed bit length and successfully receive the partial CSI reporting. For the above operation, information indicating whether the partial CSI reporting is performed may be included in Part 1 of CSI.
- The BS may assume that the UE will perform CSI reporting by adding as additional Part 3 the partial CSI reporting to conventional Type I and Type II CSI. According to 3GPP TS 38.214, for CSI feedback over a PUSCH such as Type I CSI, Type II CSI, and enhanced Type II CSI, a CSI report consists of two parts. Part I has a fixed payload size and is used to identify the number of information bits in Part 2. The entirety of Part 1 is transmitted before Part 2. If the UE includes the partial CSI reporting in new Part 3 and indicates through Part 1 whether partial CSI is included, the UE may inform whether the partial CSI reporting is included not only without any changes in existing Part 2 CSI but also without ambiguity in the bit size. Accordingly, the BS may estimate the bit length of Part 2 by receiving and decoding Part 1 of the fixed bit length and successfully receive the partial CSI reporting. For the above operation, information indicating whether the partial CSI reporting is performed may be included in Part 1 of CSI. The corresponding information may be encoded separately from the other values in CSI Part 1. In addition, CSI part 3, which is newly added in the above operation, may be encoded separately from other CSI parts.
- The BS may assume that the UE will include part of partial CSI in Part 1 of conventional Type I and II CSI and include the rest of the partial CSI in Part 2 thereof. In this case, the partial CSI included in Part 1 may be always transmitted whenever the corresponding CSI report is transmitted, regardless of whether predetermined conditions are met. Alternatively, the partial CSI included in Part 1 may always be zero-padded as much as the size of bits to be transmitted and then transmitted. The partial CSI included in Part 2 may be transmitted depending on whether the predetermined conditions are met. In this case, the CSI included in Part 1 may be composed of information on specific subband(s), such as subband(s) with even or odd indices. Accordingly, even if the BS fails to receive the Part 2 CSI due to ambiguity, the BS may receive the CSI on all radio resources through Part 1.

<Implementation B2> Hierarchical CSI Configuration for Partial CSI Reporting

The BS may provide the UE with two or more CSI configurations to enable the UE to perform partial CSI reporting. In this case, among the CSI configurations, one or more CSI configuration(s) X may be for the partial CSI reporting, and one or more other CSI configuration(s) Y may be for general CSI reporting. Each CSI configuration configured for the partial CSI reporting may be associated with the one or more CSI configuration(s) Y. For example, CSI configuration(s) X may be configured to have the one or more CSI configuration(s) Y as reference CSI configuration(s). Alternatively, for one CSI configuration Y, a parent-child relationship may be established with Y as the parent and X as the child.

When at least one of the condition(s) illustrated in Implementation A1/B1 is satisfied for CSI configuration(s) Y, the BS may assume that the UE will consider that the partial CSI reporting is triggered for CSI configuration(s) X associated with CSI configuration(s) Y. Accordingly, the BS may assume that the UE will perform the partial CSI reporting. For example, the BS may assume that the partial CSI reporting will be triggered to the UE based on another CSI configuration associated with partial CSI configuration(s) X Accordingly, the BS may assume that the UE will perform the partial CSI reporting. Such triggering may be performed based on CSI reported through the other CSI configuration.

<Implementation B3> PUCCH Resource Selection for Partial CSI Reporting

In systems based on some scenarios (e.g., NR Rel-16 based systems), the UE may determine a PUCCH to be used based on the size of all UCI bits for PUCCH transmission, which are to be included in the PUCCH, and a set of PUCCH resources indicated or configured for the corresponding PUCCH transmission. If multiple PUCCH transmissions overlap in time, the PUCCH to be used may be determined based on to the size of all UCI bits to be transmitted in the overlapping PUCCHs and the type of UCI (e.g., SR, HARQ-ACK, CSI, etc.).

The BS needs to know the exact size of all UCI bits transmitted by the UE to predict the PUCCH transmission from the UE. However, when some implementations of the present disclosure are applied or when the UE autonomously performs the partial CSI reporting, the total UCI bit size may vary depending on whether the partial CSI reporting is performed. This may result in ambiguity between the UE and BS. To address the issue, at least one of the following methods may be used to ensure that the UE and BS determine the same PUCCH resources.

- The UE and BS may assume a specific value for the UCI size of the partial CSI reporting when selecting PUCCH resources. The specific value may be determined regardless of whether the partial CSI reporting is actually performed.
  - The specific value may be a predefined value, a value configured by higher layer signaling from the BS, or a value indicated by L1 signaling. For example, the specific value may be a value determined based on parameter(s) in a CSI configuration associated with the partial CSI reporting or correspond to the maximum length of CSI bits capable of being transmitted based on the corresponding CSI configuration.
  - If the specific value is smaller than the actual bit length of CSI required for transmission, the UE may omit part of the CSI such that the CSI bit length becomes smaller than or equal to the specific value. To implement this operation, the specific value may be set to an upper limit of the CSI bit length capable of being included during the UCI multiplexing process. Such a process may be performed for each constituent part of the CSI, and in this case, the specific value may be an upper limit of the bit size of a part that includes the partial CSI reporting.
- If the partial CSI reporting is transmitted only when predetermined conditions are satisfied, the UE and BS may assume that the partial CSI reporting is always transmitted on configured resources and then select PUCCH resources for CSI reporting.

<Implementation B4> Extended CQI Bit Range

When the UE reports CQI information as part of CSI, a larger bit size may be allocated for CQI reporting to enhance the accuracy of the CQI information. In particular, when the UE reports a CQI value per subband, it may be considered to use a 3-bit differential CQI table or a 4-bit CQI table, instead of using a 2-bit differential CQI table. For partial CQI reporting, this operation may be beneficial because the CQI information is extended and transmitted instead of an RI/PMI. Further, even when the partial CQI reporting is not performed, the operation may improve the accuracy of the CQI information. For example, the 3-bit differential CQI table illustrated in Table 9 may be employed. Alternatively, one of the 4-bit CQI tables shown in Tables 10 to 13 may be used.

However, if the 3-bit differential CQI table or the 4-bit CQI table is used for all subbands at all times, CSI overhead may increase. To address this issue, at least one of the following methods may be considered.

- Method 1: The MSBs of a bit sequence in which Part 1 CSI or a subband CQIis included may contain a bit length used for the entirety or part of the subband CQI. The BS may assume that the UE will extend per-subband CQI to the bit length to be used by the CQI and report the subband CQI as Part 2 CSI. The UE is allowed to transmit the extended CQI information only when the UE needs to transmit the extended CQI information. For example, the BS may assume that the UE will report the CSI by including one bit (e.g., '0'=legacy and 'I'=extended to three bits) indicating the bit length to be used for the subband CQI in the Part I CSI and including the subband CQI to which the extended CQI bit range is applied in the Part 2 CSI. Upon receiving the CSI, the BS may interpret the subband CQI to be reported in the Part 2 CSI.

Additionally, in some implementations of the present disclosure, subband CSI reporting to which the extended CQI bit range is applied may be assigned a higher priority compared to other CSI reporting. For example, the values of y or k may be determined depending on whether the extended CQI bit range is applied when the priorities of CSI reports are determined as follows: the CSI reports are associated with a priority value of $Pri_{iCSI}(y,k,c,s)=2*N_{cells}*M_s*y+N_{cells}*M_s*k+M_s*c+s$, where:

- y=0 for aperiodic CSI reports to be carried on the PUSCH, y=1 for semi-persistent CSI reports to be carried on the PUSCH, y=2 for semi-persistent CSI reports to be carried on the PUCCH, and y=3 for periodic CSI reports to be carried on the PUCCH;
- k=0 for CSI reports carrying L1-RSRP or L1-SINR and k=1 for CSI reports not carrying L1-RSRP or L1-SINR;
- c is the index of a serving cell, and $N_{cells}$ is the value of the higher layer parameter maxNrofServingCells provided by the BS; and
- s is reportConfigID, and $M_s$ is the value of the higher layer parameter maxNrofCSI-ReportConfigurations provided by the BS.

If the associated value of $Pri_{iCSI}(y,k,c,s)$ is lower for a first CSI report than for a second CSI report, the first CSI report may be said to have priority over the second CSI report.

As an example, when the extended CQI bit range is applied, k may be determined as follows: k=0 or k=−1.

As another example, when the extended CQI bit range is applied, a value obtained by subtracting 0.5 or 1 from the determined value of k may be used. If the value of k is smaller than 0 due to the above operation, k=0 may be used.

As a further example, when the extended CQI bit range is applied, a value obtained by subtracting 0.5 or 1 from the determined value of y may be used. If the value of y is smaller than 0 due to the above operation, y=0 may be used.

In some implementations of the present disclosure, the UE and BS may configure higher layer parameters required for CSI reporting (e.g., parameter(s) of CSI-ReportConfig, parameter(s) of CSI-ResourceConfig, etc.). If conditions for triggering partial CSI reporting are satisfied according to some implementations of the present disclosure, the UE reuse separately configured PUCCH resources or PUCCH resources used for conventional CSI reporting (e.g., existing PUCCH resources configured for the conventional CSI reporting) in order to perform the partial CSI reporting. Only when the conditions according to some implementations of the present disclosure are satisfied, the BS may expect that the UE will perform the partial CSI reporting. Then, the BS may receive and decode a CSI report from the UE. Alternatively, in some implementations of the present disclosure, the BS may recognize the partial CSI reporting performed by the UE by performing blind decoding of the partial CSI reporting or based on an indicator included in CSI transmission. Then, the BS may receive and decode the partial CSI reporting.

According to some implementations of the present disclosure, the UE may transmit CSI that does not contain some content (e.g., some CSI parameters), thereby reducing the CSI processing time of the UE. Accordingly, the UE may reduce the delay time required to report the overall channel state and report to the BS CSI with high accuracy. Considering that the UE uses less information for CSI reporting, the BS may achieve the same level of reliability using fewer radio resources, which may assist in conserving overall UL system resources.

The UE may perform operations according to some implementations of the present disclosure in association with transmission of CSI report. The UE may include at least one transceiver; at least one processor; and at least one computer memory operably connectable to the at least one processor and storing instructions that, when executed, cause the at least one processor to perform operations according to some implementations of the present disclosure. A processing device for a UE may include at least one processor; and at least one computer memory operably connectable to the at least one processor and storing instructions that, when executed, cause the at least one processor to perform operations according to some implementations of the present disclosure. A computer readable (non-transitory) storage medium may store at least one computer program including instructions that, when executed by at least one processor, cause the at least one processor to perform operations according to some implementations of the present disclosure. A computer program or a computer program product may include instructions recorded in at least one computer readable (non-transitory) storage medium and causing, when executed, (at least one processor) to perform operations according to some implementations of the present disclosure. In the UE, the processing device, the computer readable (non-transitory) storage medium, and/or the computer program product, the operations may include: receiving a RRC configuration related to CSI reporting; receiving trigger information that triggers reporting of a set of CSI values configured by the RRC configuration; determining a measurement resource for the CSI report and a UL resource for the CSI report based on the radio resource configuration and the trigger information; and based on that a time difference between the measurement resource and the UL resource satisfies a predetermined condition, performing partial CSI reporting in which only part of the set of CSI values is calculated and the calculated CSI values are transmitted on the UL resource.

In some implementations, the predetermined condition may include that the time difference is smaller than a CSI computation time T1 predefined based on full CSI reporting in which the entirety of the configured set of CSI values is calculated and greater than a time T2 based on an end of the measurement resource for the partial CSI reporting.

In some implementations, the operations may include, based on that the time difference is greater than T2, performing the full CSI reporting in which the entirety of the set of CSI values is calculated and the calculated set of CSI values is transmitted on the UL resource.

In some implementations, the measurement resource may not be later than the UL resource.

In some implementations, the RRC configuration may include a CSI configuration for the partial CSI reporting.

In some implementations, regarding the operations, performing the partial CSI reporting may include transmitting additional information about the partial CSI reporting on the uplink resource.

The BS may perform operations according to some implementations of the present disclosure in association with reception of CSI report. The BS may include at least one transceiver; at least one processor; and at least one computer memory operably connectable to the at least one processor and storing instructions that, when executed, cause the at least one processor to perform operations according to some implementations of the present disclosure. A processing device for a BS may include at least one processor; and at least one computer memory operably connectable to the at least one processor and storing instructions that, when executed, cause the at least one processor to perform operations according to some implementations of the present disclosure. A computer readable (non-transitory) storage medium may store at least one computer program including instructions that, when executed by at least one processor, cause the at least one processor to perform operations according to some implementations of the present disclosure. A computer program or a computer program product may include instructions recorded in at least one computer readable (non-transitory) storage medium and causing, when executed, (at least one processor) to perform operations according to some implementations of the present disclosure. In the BS, the processing device, the computer readable (non-transitory) storage medium, and/or the computer program product, the operations may include: transmitting an RRC configuration related to CSI reporting to a UE; transmitting, to the UE, trigger information that triggers reporting of a set of CSI values configured by the RRC configuration; receiving the trigger information that triggers reporting of the set of CSI values configured by the RRC configuration; determining a measurement resource for the CSI report and a UL resource for the CSI report based on the radio resource configuration and the trigger information; and based on that a time difference between the measurement resource and the UL resource satisfies a predetermined condition, receiving partial CSI reporting in which only part of the set of CSI values is received on the UL resource.

In some implementations, the predetermined condition may include that the time difference is smaller than a CSI computation time T1 predefined based on full CSI reporting in which the entirety of the configured set of CSI values is calculated and greater than a time T2 based on an end of the measurement resource for the partial CSI reporting.

In some implementations, the operations may include, based on that the time difference is greater than T2, receiving the full CSI reporting in which the entirety of the set of CSI values is calculated and the calculated set of CSI values is received on the UL resource.

In some implementations, the measurement resource may not be later than the UL resource.

In some implementations, the RRC configuration may include a CSI configuration for the partial CSI reporting.

In some implementations, regarding the operations, performing the partial CSI reporting may include receiving additional information about the partial CSI reporting on the UL resource.

The examples of the present disclosure as described above have been presented to enable any person of ordinary skill in the art to implement and practice the present disclosure. Although the present disclosure has been described with reference to the examples, those skilled in the art may make various modifications and variations in the example of the present disclosure. Thus, the present disclosure is not intended to be limited to the examples set for the herein, but is to be accorded the broadest scope consistent with the principles and features disclosed herein.

INDUSTRIAL APPLICABILITY

The implementations of the present disclosure may be used in a BS, a UE, or other equipment in a wireless communication system.

The invention claimed is:

1. A method performed by a user equipment (UE), the method comprising:

receiving radio resource control (RRC) configuration information related to channel state information (CSI) reporting;

receiving downlink control information (DCI) that triggers the CSI reporting;

based on the RRC configuration information and the DCI, determining a measurement resource for the CSI reporting and an uplink resource for the CSI reporting; and based on that a time difference between the measurement resource and the uplink resource satisfies a predetermined condition, performing partial CSI reporting, wherein, performing of the partial CSI reporting comprises calculating only part of a set of CSI values configured based on the RRC configuration information and transmitting an indicator for the partial CSI reporting and partial CSI including the calculated CSI values on the uplink resource, and wherein the indicator for the partial CSI reporting indicates whether the partial CSI reporting is performed and the indicator is encoded separately from the partial CSI.

2. The method of claim 1, wherein the predetermined condition comprises:

the time difference is smaller than a CSI computation time T1 predefined based on full CSI reporting in which the entirety of the set of CSI values is calculated and greater than a time T2 based on an end of the measurement resource for the partial CSI reporting.

3. The method of claim 2, further comprising:

based on that the time difference is greater than T1, performing the full CSI reporting, wherein performing of the full CSI reporting comprises calculating the entirety of the set of CSI values is calculated and transmitting the calculated set of CSI values on the uplink resource.

4. The method of claim 1, wherein the measurement resource is not later than the uplink resource.

5. The method of claim 1, wherein the RRC configuration information comprises configuration information related to the partial CSI reporting.

6. A user equipment (UE), the UE comprising:

at least one transceiver;

at least one processor; and at least one computer memory operably connected to the at least one processor and configured to store instructions that, when executed, cause the at least one processor to perform operations comprising:

receiving radio resource control (RRC) configuration information related to channel state information (CSI) reporting;

receiving downlink control information (DCI) that triggers the CSI reporting;

based on the RRC configuration information and the DCI, determining a measurement resource for the CSI reporting and an uplink resource for the CSI reporting; and based on that a time difference between the measurement resource and the uplink resource satisfies a predetermined condition, performing partial CSI reporting, wherein, performing of the partial CSI reporting comprises calculating only part of the set of CSI values and transmitting an indicator for the partial CSI reporting and partial CSI including the calculated CSI values on the uplink resource, and wherein the indicator for the partial CSI reporting indicates whether the partial CSI reporting is performed and the indicator is encoded separately from the partial CSI.

7. A base station (BS), the BS comprising:

at least one transceiver;

at least one processor; and at least one computer memory operably connected to the at least one processor and configured to store instructions that, when executed, cause the at least one processor to perform operations comprising:

transmitting, to a user equipment (UE), radio resource control (RRC) configuration information related to channel state information (CSI) reporting;

transmitting, to the UE, downlink control information (DCI) that triggers the CSI reporting; and receiving on an uplink resource for the CSI reporting, from the UE, an indicator for a partial CSI reporting and partial CSI including only part of a set of CSI values configured based on the RRC configuration information, wherein, based on that a time difference between a measurement resource for the CSI reporting and an uplink resource for the CSI reporting determined based on the RRC configuration information and the DCI satisfies a predetermined condition, the partial CSI reporting is performed by the UE, and wherein the indicator for the partial CSI reporting indicates whether the partial CSI reporting is performed and the indicator is encoded separately from the partial CSI.

8. The BS of claim 7, wherein the predetermined condition comprises:

the time difference is smaller than a CSI computation time T1 predefined based on full CSI reporting in which the entirety of the set of CSI values is calculated and greater than a time T2 based on an end of the measurement resource for the partial CSI reporting.

9. The BS of claim 8, wherein, based on that the time difference is greater than T1, the full CSI reporting is performed by the UE, and wherein, based on that the full CSI reporting is performed, the entirety of the set of CSI values is calculated by the UE and the calculated set of CSI values is received on the uplink resource.

10. The BS of claim 7, wherein the measurement resource is not later than the uplink resource.

11. The BS of claim 7, wherein the RRC configuration information comprises configuration information related to the partial CSI reporting.

* * * * *